US012575998B2

(12) United States Patent
Clausen et al.

(10) Patent No.: US 12,575,998 B2
(45) Date of Patent: Mar. 17, 2026

(54) CRUTCH WITH A CONTOURED GRIP AND A FOREARM SUPPORT

(71) Applicant: Össur Iceland ehf, Reykjavik (IS)

(72) Inventors: Arinbjörn Viggo Clausen, Reykjavik (IS); Aron Kristbjorn Albertsson, Hafnarfjordur (IS); Christophe Guy Lecomte, Reykjavik (IS)

(73) Assignee: Össur Iceland ehf, Reykjavik (IS)

( * ) Notice: Subject to any disclaimer, the term of this patent is extended or adjusted under 35 U.S.C. 154(b) by 286 days.

(21) Appl. No.: 18/254,834

(22) PCT Filed: Nov. 24, 2021

(86) PCT No.: PCT/IB2021/060898
§ 371 (c)(1),
(2) Date: May 26, 2023

(87) PCT Pub. No.: WO2022/112955
PCT Pub. Date: Jun. 2, 2022

(65) Prior Publication Data

US 2024/0299231 A1 Sep. 12, 2024

Related U.S. Application Data

(60) Provisional application No. 63/119,427, filed on Nov. 30, 2020.

(51) Int. Cl.
*A61H 3/02* (2006.01)

(52) U.S. Cl.
CPC ........ *A61H 3/02* (2013.01); *A61H 2003/0211* (2013.01); *A61H 2003/025* (2013.01);
(Continued)

(58) Field of Classification Search
CPC ............................ A61H 2003/025; A61H 3/02
See application file for complete search history.

(56) References Cited

U.S. PATENT DOCUMENTS 3,995,650 A * 12/1976 DiVito .................... A61H 3/02
16/DIG. 30
4,151,853 A 5/1979 Inbar
(Continued)

FOREIGN PATENT DOCUMENTS

DE 29513346 U1 10/1995
DE 202013003248 U1 7/2013
(Continued)

OTHER PUBLICATIONS

International Search Report and Written Opinion, PCT/IB2021/060898, Apr. 29, 2022.

*Primary Examiner* — Noah Chandler Hawk
(74) *Attorney, Agent, or Firm* — Knobbe, Martens, Olson & Bear, LLP

(57) ABSTRACT

Various features for improving the performance of crutches are provided. A handle can be contoured to match a shape of a hand. The handle can include a flexible portion to allow the handle to flex when gripped. In some aspects, the handle can include a shaft that receives a grip and locks the rotation of the grip. In some aspects, the handle can include a recess to receive an adapter that supports one or more items. A cuff of the crutch can be larger and narrower at one or more locations to offer varying levels of support along a forearm and wrist. The cuff can include a crutch support that allows the crutch to engage with a support. In some aspects, the cuff can include a rearward with particular friction properties. The cuff can include slots that allow for the height of the cuff to be adjusted.

19 Claims, 25 Drawing Sheets

(52) U.S. Cl.
CPC ................ *A61H 2201/0107* (2013.01); *A61H 2201/0192* (2013.01); *A61H 2201/1645* (2013.01)

(56) References Cited

U.S. PATENT DOCUMENTS

| | | | | |
|---|---|---|---|---|
| 4,869,280 | A | 9/1989 | Ewing | |
| D339,468 | S | 9/1993 | Mertz | |
| 5,295,499 | A * | 3/1994 | Stutz | A61H 3/0244 248/688 |
| 5,331,989 | A | 7/1994 | Stephens | |
| 5,339,850 | A | 8/1994 | Mertz | |
| 5,458,143 | A | 10/1995 | Herr | |
| 5,555,904 | A | 9/1996 | Stockwell | |
| 5,564,451 | A | 10/1996 | Hagberg | |
| 5,671,765 | A | 9/1997 | Hagberg, Jr. | |
| 5,711,334 | A | 1/1998 | Roux | |
| 5,860,439 | A | 1/1999 | Ostertag | |
| D426,377 | S | 6/2000 | Barnes et al. | |
| 6,182,877 | B1 | 2/2001 | Rolfe | |
| D457,414 | S | 5/2002 | Spangmyr et al. | |
| H2138 | H | 1/2006 | Pullman et al. | |
| 7,104,271 | B2 | 9/2006 | Larson et al. | |
| 7,204,262 | B2 | 4/2007 | DeMay et al. | |
| 7,347,215 | B1 * | 3/2008 | Birnbaum | A61H 3/0277 135/69 |
| 7,434,592 | B2 | 10/2008 | Larson et al. | |
| 7,487,788 | B2 | 2/2009 | Baker | |
| 7,490,618 | B2 | 2/2009 | DeMay et al. | |
| 7,503,337 | B1 | 3/2009 | Morgan et al. | |
| 7,537,017 | B2 | 5/2009 | Baker | |
| 7,588,044 | B2 | 9/2009 | Baker | |
| 7,591,275 | B2 | 9/2009 | Baker | |
| 7,621,288 | B2 | 11/2009 | Evans | |
| 7,637,882 | B2 | 12/2009 | Carman, Jr. et al. | |
| 8,418,706 | B2 | 4/2013 | Weber | |
| 8,453,663 | B2 | 6/2013 | Zordan et al. | |
| 8,474,470 | B2 | 7/2013 | Albertyn | |
| 8,707,975 | B2 | 4/2014 | Larson et al. | |
| 8,740,242 | B2 * | 6/2014 | Slomp | B26B 3/02 280/87.051 |
| 8,950,415 | B1 | 2/2015 | Spletzer et al. | |
| 9,032,982 | B2 | 5/2015 | Summit et al. | |
| 9,289,346 | B2 | 3/2016 | Demski et al. | |
| 9,364,384 | B2 | 6/2016 | Van Den Driesche | |
| 9,532,917 | B2 | 1/2017 | Summit et al. | |
| 9,662,263 | B2 | 5/2017 | Hsiao-Wecksler | |
| 9,801,776 | B2 | 10/2017 | Larson et al. | |
| 9,808,393 | B2 | 11/2017 | Varghese et al. | |
| 10,010,474 | B2 | 7/2018 | Wang | |
| 10,064,781 | B2 | 9/2018 | Clausen et al. | |
| 10,172,759 | B2 | 1/2019 | Rodriguez et al. | |
| 10,231,896 | B2 | 3/2019 | Younger | |
| 10,350,132 | B1 | 7/2019 | Chu et al. | |
| 10,369,072 | B2 | 8/2019 | Herman, Jr. et al. | |
| 10,532,001 | B2 | 1/2020 | Younger | |
| 10,537,489 | B1 | 1/2020 | Youn et al. | |
| D876,807 | S * | 3/2020 | Shintani | D3/7 |
| 10,863,804 | B2 * | 12/2020 | Shintani | B25G 1/102 |
| 2004/0051020 | A1 * | 3/2004 | Hopkins | A61H 3/0244 248/345.1 |
| 2007/0131264 | A1 | 6/2007 | DeMay et al. | |
| 2007/0256718 | A1 | 11/2007 | Diaz | |
| 2008/0053503 | A1 | 3/2008 | Larson et al. | |
| 2008/0223424 | A1 | 9/2008 | Hollier | |
| 2009/0114257 | A1 | 5/2009 | Sutton | |
| 2009/0127830 | A1 | 5/2009 | Soni et al. | |
| 2009/0235966 | A1 | 9/2009 | Birnbaum | |
| 2010/0024857 | A1 | 2/2010 | Larson et al. | |
| 2010/0071738 | A1 | 3/2010 | Evans | |
| 2010/0236590 | A1 | 9/2010 | Diaz | |
| 2011/0240077 | A1 | 10/2011 | Doherty et al. | |
| 2012/0055523 | A1 | 3/2012 | Diaz | |
| 2013/0199586 | A1 | 8/2013 | Van Den Driesche | |
| 2013/0276844 | A1 | 10/2013 | Moulton | |
| 2017/0023220 | A1 * | 1/2017 | Chien | F21V 23/04 |
| 2018/0021201 | A1 | 1/2018 | Varghese et al. | |
| 2018/0153759 | A1 | 6/2018 | Clausen et al. | |
| 2018/0333322 | A1 | 11/2018 | Clausen et al. | |
| 2020/0155408 | A1 * | 5/2020 | Fathi | A61H 1/00 |
| 2022/0015981 | A1 * | 1/2022 | Younger | A61H 3/0288 |
| 2024/0277553 | A1 * | 8/2024 | De Winter | A61H 3/04 |

FOREIGN PATENT DOCUMENTS

| | | |
|---|---|---|
| EP | 2827824 B1 | 7/2019 |
| WO | WO 2019/055392 | 3/2019 |
| WO | WO 2022/112955 | 6/2022 |

* cited by examiner

CRUTCH WITH A CONTOURED GRIP AND A FOREARM SUPPORT

RELATED APPLICATIONS

The present application is a U.S. National Phase Application of International Application No. PCT/IB2021/060898, entitled "CRUTCH WITH A CONTOURED GRIP AND A FOREARM SUPPORT," filed Nov. 24, 2021, which claims the benefit of priority to U.S. Provisional Application No. 63,119,427, entitled "CRUTCH WITH A CONTOURED GRIP AND A FOREARM SUPPORT," filed Nov. 30, 2020, each of which is hereby incorporated herein by reference in its entirety.

BACKGROUND

Field

The present application generally relates to crutches, and more particularly, to crutches with a contoured grip and a forearm support.

Description of the Related Art

A crutch is a mobility aid that can be used to support all or part of a user's body weight. A crutch can be provided for one or both sides of the body and can reach from a user's underarm, wrist area, hand and the like to a walking surface.

There are several disadvantages to traditional crutches. Many people have difficulty coordinating movement with crutches due to the uncomfortable positioning of the crutches at the underarms. Further, the user may quickly become fatigued and unable to use the crutches for a prolonged period of time. Additionally, the stress placed on the user's hands and wrists by conventional crutch designs may cause further discomfort or injury.

SUMMARY

It would be desirable to have a crutch that allows the user to make use of his or her elbows and/or upper arms to support his or her body weight. It would also be desirable to have a crutch with a contoured grip and a forearm support capable of supporting and aiding the user, thereby reducing fatigue during ambulation and allowing the user to utilize the crutches for a prolonged period of time (e.g., while at work, etc.).

In some aspects a crutch is provided with a contoured grip and a forearm support that can provide various features to aid the user before, during, and/or after ambulation.

In some embodiments, a crutch comprises a forearm support, a handle configured for gripping by a user, and a distal portion extending distally and configured to provide support to the user, wherein the forearm support comprises a wrist section and a forearm section. The wrist section is configured to support a wrist portion of the user and the forearm section is configured to support a forearm portion of the user. A first side of the forearm section is configured to provide a first level of support to the forearm portion of the user, and a second side of the forearm section is configured to provide a second level of support to the forearm portion of the user, wherein the first level of support differs from the second level of support. In some embodiments, the handle comprises a contoured handle.

The crutch of the preceding paragraph may also include a rear wall of the forearm support, wherein the rear wall comprises a first material with first friction properties and the forearm section comprises a second material with second friction properties, wherein the first friction properties are greater than the second friction properties. In some embodiments, the first material comprises one or more of rubber or silicone.

The crutch of any of the preceding paragraphs may also optionally include a forearm support that comprises one or more slots. In some embodiments, the forearm support is configured to engage with a portion of the crutch via the one or more slots, wherein a first slot of the one or more slots and a second slot of the one or more slots provide height adjustment of the crutch by adjusting a position of the forearm support relative to the crutch.

The crutch of any of the preceding paragraphs may also optionally include a crutch support, the crutch support configured to engage a support to provide stability to the crutch.

In some embodiments, a crutch comprises a forearm support configured to support a forearm of a user, a handle configured for gripping by the user, and a distal portion extending distally from the central portion and configured to provide support to the user. The handle comprises a recess at one end of the handle that defines one or more hooks, the one or more hooks configured to engage with an adapter. In some embodiments, the adapter supports one or more items therefrom while the user grabs the handle. In some embodiments, the adapter connects to a second adapter of a second crutch to form a support. In some embodiments, the handle further comprises a contoured handle. In some embodiments, the handle further comprises a shaft, the shaft configured to receive a grip, wherein the shaft and the grip are configured to couple in a key-slot connection to fix an angular orientation of the grip on the shaft, the grip configured to be grabbed by the user to support the user's hand.

In some embodiments, a crutch comprises a forearm support configured to support a forearm of a user, a handle configured for gripping by the user, and a distal portion extending distally and configured to provide support to the user. The handle comprises a shaft, the shaft configured to receive a grip, wherein the shaft and the grip are configured to couple in a key-slot connection to fix an angular orientation of the grip on the shaft, the grip configured to be grabbed by the user to support the user's hand. In some embodiments, the handle further comprises a contoured handle. In some embodiments, the handle further comprises a recess at one end of the handle that defines one or more hooks, the one or more hooks configured to engage with an adapter. In some embodiments, the handle further comprises a first portion and a second portion, the second portion of the handle configured to flex relative to the first portion of the handle.

In some embodiments, a crutch comprises a forearm support configured to support a forearm of a user, a handle configured for gripping by the user, and a distal portion extending distally and configured to provide support to the user. The handle comprises a first portion and a second portion, the second portion of the handle configured to flex relative to the first portion of the handle. In some embodiments, the handle comprises a hinge that facilitates flexion of the second portion relative to the first portion. In some embodiments, the hinge comprises a slot extending at least partially through the handle that facilitates flexion of the second portion relative to the first portion. In some embodiments, the hinge comprises a slot extending fully through the handle that facilitates flexion of the second portion relative to the first portion. In some embodiments, the hinge comprises a portion of reduced thickness relative to surrounding portions of the handle that facilitates flexion of the second portion relative to the first portion. In some embodiments, the hinge comprises a first slot and a second slot, the first slot extending partially through the handle in a first axis and the second slot extending partially through the handle in a second axis, wherein the first axis differs from the second axis, wherein the first and second slots facilitate flexion of the second portion relative to the first portion. In some embodiments, the hinge comprises a first portion of reduced thickness and a second portion of reduced thickness, the first portion of reduced thickness extending generally along a first axis and the second portion of reduced thickness extending generally along a second axis, wherein the first axis differs from the second axis, wherein the first and second portions of reduced thickness facilitate flexion of the second portion relative to the first portion. In some embodiments, the hinge comprises a portion of the handle of a first material with first flexion properties that differ from adjacent portions of the handle of a second material with second flexion properties, wherein the first flexion properties differ from the second flexion properties, wherein the difference between the first and second flexion properties facilitate flexion of the second portion relative to the first portion.

In some embodiments, a crutch comprises a forearm support, a handle configured for gripping by a user, and a distal portion extending distally and configured to provide support to the user, wherein the forearm support comprises a wrist section and a forearm section. The wrist section is configured to support a wrist portion of the user and the forearm section is configured to support a forearm portion of the user. A first side of the forearm section is configured to provide a first level of support to the forearm portion of the user, and a second side of the forearm section is configured to provide a second level of support to the forearm portion of the user, wherein the first level of support differs from the second level of support. The handle comprises a first portion and a second portion, the second portion of the handle configured to flex relative to the first portion of the handle via a hinge. In some embodiments, the hinge comprises one or more slots, one or more portions of reduced thickness, or a first material with first flexion properties and adjacent second portion of a second material with second flexion properties, wherein the first flexion properties differ from the second flexion properties.

The crutch of the preceding paragraph may optionally include a crutch support, the crutch support configured to engage a support to provide stability to the crutch.

All of these embodiments are intended to be within the scope of the disclosure herein. These and other embodiments will become readily apparent to those skilled in the art from the following detailed description having reference to the attached figures, the disclosure not being limited to any particular disclosed embodiment(s).

BRIEF DESCRIPTION OF THE DRAWINGS

These and other features, aspects, and advantages of the present disclosure are described with reference to the drawings of certain embodiments, which are intended to schematically illustrate certain embodiments and not to limit the disclosure.

DETAILED DESCRIPTION

Although certain embodiments and examples are described below, those of skill in the art will appreciate that the disclosure extends beyond the specifically disclosed embodiments and/or uses and obvious modifications and equivalents thereof. Thus, it is intended that the scope of the disclosure herein disclosed should not be limited by any particular embodiments described below.

The present disclosure provides various examples of crutches and features for crutches. In some embodiments, crutches can have a forearm support that provides varying levels of support along the forearm and the wrist. For example, the forearm support may provide a greater level support at a first portion of the forearm and a lesser level of support at a second portion of the forearm when a user is engaging the crutch. In some embodiments, crutches can have a shaft that receives a contoured grip. For example, the shaft may receive the contoured grip via a key-slot configuration such that the grip and the shaft can be locked into a certain position (e.g., angular orientation). In some embodiments, crutches can have a contoured grip with certain flexion properties. For example, the contoured grip may include a first portion with first flexion properties and a second portion with second, different flexion properties. In some embodiments, crutches can have a contoured grip that includes a recess to receive an adapter that enables additional functionality to be achieved by the grip. For example, the adapter may allow the crutch to support objects (e.g., bags) during ambulation. In some embodiments, crutches can have a cuff including various slots. For example, the various slots may allow a user to adjust the height of the cuff. In some embodiments, crutches can have a crutch support to allow the user to support the crutch. For example, the user may rest the crutch on a tabletop by using the crutch support.

General Overview

Figure 1:
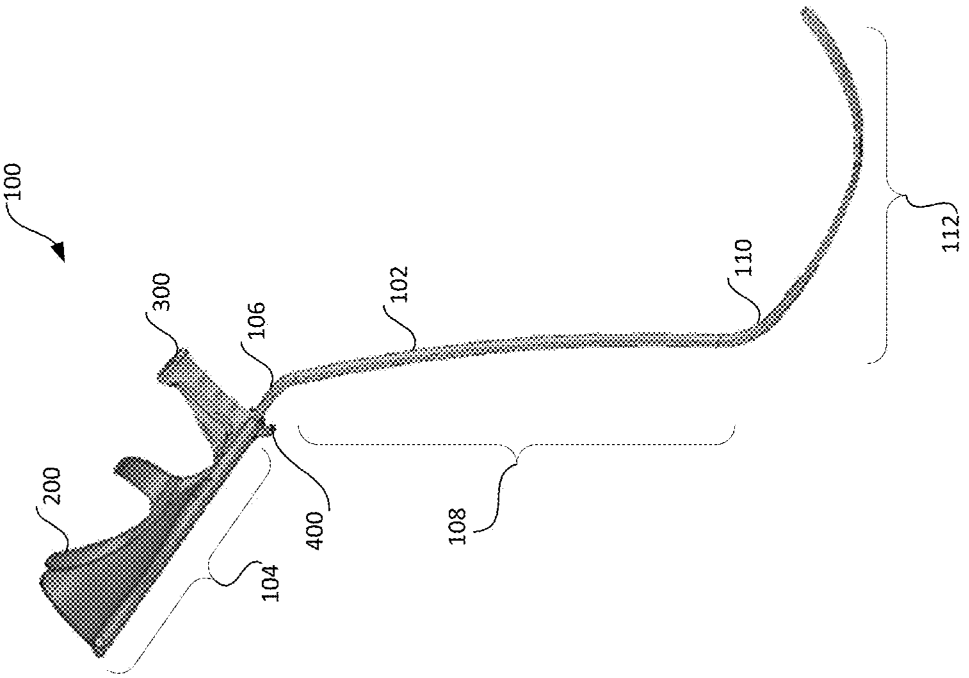
FIG. 1 illustrates a side view of a crutch with a forearm support and a contoured handle, according to some embodiments.

FIG. 1 illustrates a crutch 100 with various components to aid and support a user prior to, during, and after ambulation, according to some embodiments. A crutch 100 such as the one illustrated in FIG. 1 is designed to efficiently store and release energy produced during ambulation to improve crutch assistance and ease of use. It will be understood that the various features and/or components as discussed below may be implemented in other types of crutches, including crutches that do not efficiently store and release energy produced during ambulation. The crutch 100 includes an elongate member 102, an arm cuff 200, a hand grip 300, and a crutch support 400. The elongate member 102 includes a proximal portion 104, a central portion 108 distally connected to the proximal portion 104 via a first transition section 106 and extended at a first angle relative to the proximal portion 104, and a curved distal portion 112 distally connected to the central portion 108 via a second transition section 110 and extended at a second angle relative to the central portion 108.

The curved distal portion 112 (e.g., the "foot portion") of the crutch 100 can bend or flex along its length (e.g., including at the distal end), which advantageously improves (e.g., increases the length of) the stride when using the crutch 100 to propel the user forward (e.g., by a greater amount than if the curved distal portion 112 did not bend or flex). The crutch 100 rolls over along the contact surface of the curved distal portion 112 during use and, as the crutch 100 rolls over the contact surface, the user of the crutch 100 is propelled forward.

The first transition section 106 is angled such that the proximal portion 104 extends at the first angle relative to the central portion 108. In some examples, the first angle is an obtuse angle (for instance, about 100, 105, 110, 115, 120, 125, 130, 135, 137, 140, 145, 150, 155, 160 or 165 degrees). In some examples, the proximal portion 104 is generally aligned with the central portion 108 such that the first angle is a relatively straight angle (for instance, about 170, 175, 180, 185, or 190 degrees). In other examples, the first angle is an acute angle.

The second transition section 110 is angled such that the curved distal portion 112 extends at a second angle relative to the central portion 108. In some examples, the second angle is an obtuse angle (for instance, about 100, 105, 110, 115, 120, 125, 130, 133, 135, 137, 140, 145, 150, 155, 160 or 165 degrees). In some examples, the central portion 108 is generally aligned with the curved distal portion 112 such that the second angle is a relatively straight angle (for instance, about 170, 175, 180, 185, or 190 degrees). In other examples, the second angle is an acute angle.

The crutch 100 optionally includes a sole that can attach to a bottom surface of the curved distal portion. The sole can be a protective layer disposed on the crutch 100 such that it provides a barrier between the crutch 100 and a walking surface.

According to some aspects, the elongate member 102 can be a single (e.g., monolithic), shaped member. For example, the first and second transition sections 106, 110 can include bends in the elongate member 102. In some aspects, the elongate member 102 can be a combination of two or more attached portions. For example, the elongate member 102 can include one or more joints that can connect one or more portions of the elongate member 102. In some aspects, one or more of the proximal portion 104, the central portion 108, the curved distal portion 112, the arm cuff 200, the hand grip 300, or the crutch support 400 are optionally detachable from the crutch 100.

The arm cuff 200 is proximately attached to the proximal portion 104 and can couple to an arm of a user, for example below the user's elbow. The arm cuff 200 can provide increased support to a user by reducing strain on a user's arm. This can help to reduce wrist pressure and maintain better posture and mobility control. In some examples, the arm cuff 200 can engage a user's shoulder, bicep, forearm or wrist. In some instances, an arm cuff 200 is not included in the crutch 100 but may be an optional attachment. As will be discussed in further detail below, the arm cuff 200 may include additional features. For example, the arm cuff 200 may include varying levels of support along the length of the arm cuff 200 in order to prevent accidental disengagement with the arm cuff 200 and/or strain on the arm of the user. Further, the arm cuff 200 may include one or more slots that allow for height adjustment of the arm cuff 200 in order to adjust the arm cuff 200 based on the height of a user. Further, the arm cuff 200 may include a rear wall that has certain friction properties in order to prevent the arm cuff 200 from accidentally disengaging with a surface (e.g., a wall surface the crutch 100 is supported against when not in use).

The arm cuff 200 may include a crutch support 400. The crutch support 400 can enable the user to rest the crutch 100 on a surface (e.g., table top). This can help to avoid prolonged use of the crutch 100 while ensuring that the crutch 100 is in a ready and accessible position. For example, the user can rest the crutch 100 on a tabletop while sitting using the crutch support 400 such that the crutch 100 is easily accessible when desired. As will be discussed in greater detail below, the crutch support 400 can have a profile such that it achieves an effective pairing with a surface.

The hand grip 300 is attached to and extends outwardly from the proximal portion 104 at a location distal of the arm cuff 200. In some examples, the hand grip 300 can be attached above or below the first transition section 106. In some instances, a hand grip 300 is not included in the crutch 100 but may be an optional attachment. As will be discussed in further detail below, the hand grip 300 may include additional features. For example, the hand grip 300 may be anatomically shaped to contour to the shape of a user's hand in order to increase the comfort of the user. Further, the crutch 100 may include a shaft that receives the hand grip 300 such that one or more modular hand grips 300 can be attached to the shaft. Further, the hand grip 300 may have particular flexion properties that allow the hand grip 300 to flex and/or bend as the user engages the hand grip 300. Further, the hand grip 300 may include a recess to receive an adapter that can add additional functionality to the hand grip 300.

In some embodiments, the position of the hand grip 300 along the elongate member 102 is adjustable, for instance, to accommodate users with different preferences or arm sizes. The crutch 100 can include an aperture disposed within the proximal portion 104 where the position of the hand grip 300 is slidably adjustable along the aperture. In some examples, the hand grip 300 can be locked into position after an adjustment is made. One of skill in the art would appreciate the position of the hand grip 300 may be adjusted in a variety of different ways.

In some embodiments, the hand grip 300 can extend outwardly from the elongate member 102 at an angle such that the wrist of a user is generally maintained in a neutral and comfortable position. For example, the hand grip 300 can generally extend in a perpendicular manner from the proximal portion 104. In some examples, the orientation of the hand grip 300 can be adjusted by the user.

The curved distal portion 112 can have an overall curved profile. The curved distal portion 112 can advantageously absorb and release energy to assist in propelling the user forward during use, thereby improving user performance. For example, responsive to vertical forces generated during ambulation, the curved distal portion 112 can flex and provide energy return to the user at push-off. In some examples, vertical forces generated at the start of ambulation are stored and translated into a linear motion. This action reduces the need for the user to actively push his or her body forward using the crutch 100 and also can equalize stride length. In addition, it can provide for a more natural gait and reduced crutching and/or walking effort.

In some aspects, the curved distal portion 112 has a varying width along its length. For example, the curved distal portion 112 can have a proximal, central, and distal section. The central section can be narrower (i.e., have a smaller width transverse to the longitudinal axis of the curved distal portion when viewed from the front) than the distal section. Similarly, the central section can be narrower than the proximal section or have the same width as the proximal section. In some examples, the central section can be narrower than the distal section so that the width of the curved distal portion flares outward (e.g., gradual flare) from the central section to the distal section. A narrowed central section can advantageously reduce drag on the crutch 100 (e.g., by reducing the amount of surface area of the crutch 100 that faces airflow during use). A narrowed central section can also advantageously enhance springiness (e.g., reduced resistance to flexion) of the crutch 100 in use. In some embodiments, the curved distal portion 112 can generally have a "J" shape having a substantially straight and vertical proximal section and a generally curved distal section.

The elongate member 102 can be made of a composite material (such as carbon fiber, glass fiber, a carbon-glass fiber composite). In some embodiments, the elongate member 102 can be made of other suitable materials (e.g., metals, such as aluminum, steel, or titanium. In some examples, the crutch 100 preferably includes composite material that can flex to provide energy storage and return to the user during ambulation. For instance, a carbon fiber composite can allow more flexion than a metal, thereby offering increased energy storage (when a portion of the crutch 100 is flexed under load) and energy release (when un-flexed responsive to a release of the applied load).

In some embodiments, one or more of the proximal portion 104, the central portion 108, and/or the curved distal portion 112 can flex and un-flex responsive a force applied during ambulation. Energy can be stored during flexion and released during un-flexion in order to propel a user forward during ambulation. Further, a portion of the proximal portion 104, a portion of the central portion 108, and/or a portion of the curved distal portion 112 can flex and un-flex responsive the force applied during ambulation.

Cuff with Variable Support

Figure 2A:
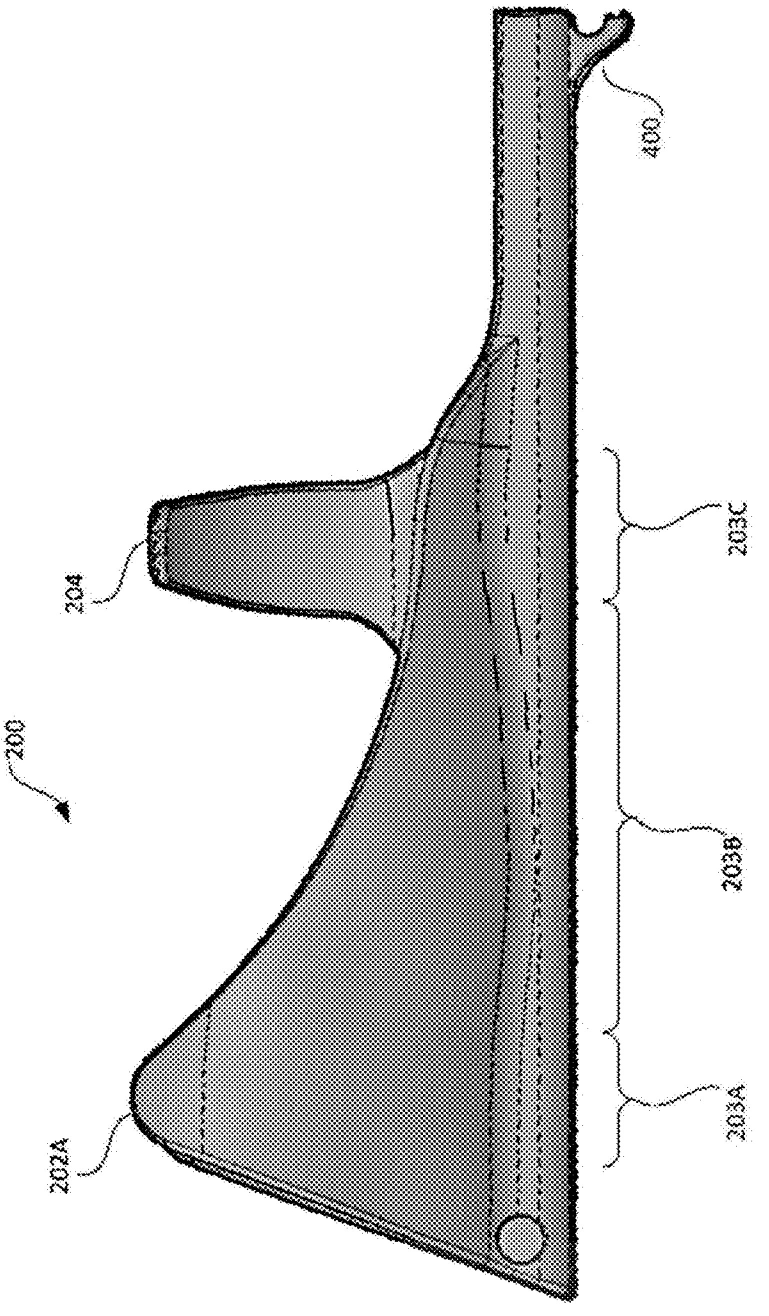
FIGS. 2A-2B illustrate a right side view and left side view, respectively, of a cuff that can be attached to the proximal portion of the crutch of FIG. 1.
Figure 2B:
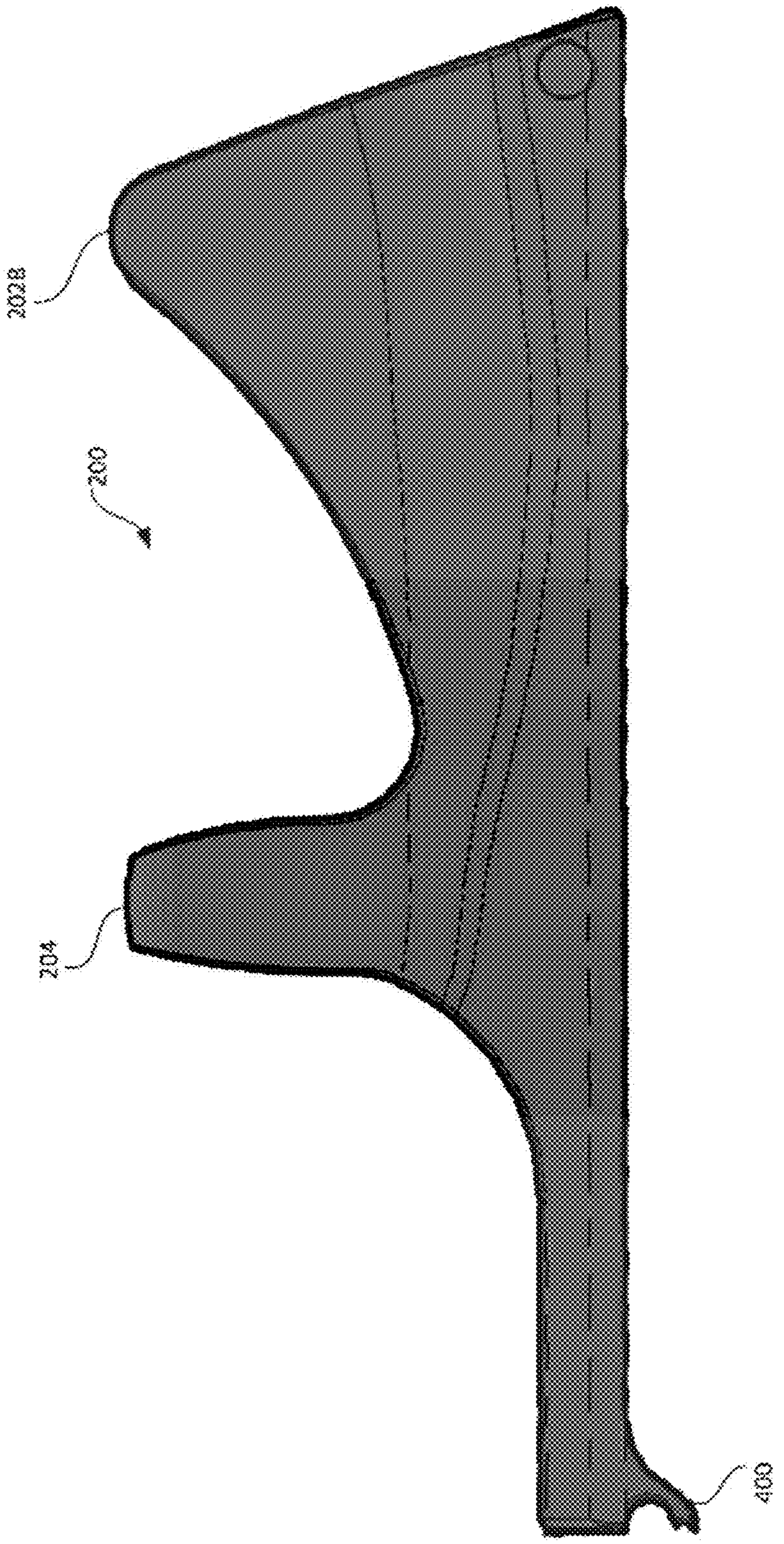

FIGS. 2A-2B illustrate perspective views of a cuff 200 that can be attached to the proximal portion 104 of the crutch 100 of FIG. 1. The cuff 200 can illustratively be attached to one or more portions of the proximal portion of the crutch. In some embodiments, the cuff 200 can be attached to other portions of the crutch (e.g., the central portion of the crutch). The cuff 200 can include varying levels of support along the length of the cuff 200 in order to partially enclose a forearm of the user when the user is engaged with the cuff 200. The varying levels of support along the cuff 200 can allow for efficient placement and easy removal of a forearm.

In the example of FIGS. 2A-2B, the cuff 200 includes a first forearm support 202A, a second forearm support 202B, and a wrist support 204. It will be understood that the cuff 200 may include more, less, or different supports. For example, the cuff 200 may include multiple wrist supports. Optionally, the first forearm support 202A, the second forearm support 202B, and the wrist support 204 can be part of a single unitary (e.g., monolithic or seamless) piece that can couple to a proximal end of the crutch body (e.g., elongate member 102). Optionally, the unitary piece can slidably couple to the proximal end of the crutch body. Further, optionally, the first forearm support 202A, the second forearm support 202B, and the wrist support 204 can be distinct supports that can couple together to form the cuff 200.

The first forearm support 202A and the second forearm support 202B can provide support medially, laterally, and/or to the top of a user's forearm. The first forearm support 202A and the second forearm support 202B can provide support to the sides of the user's forearm, thereby preventing the user's forearm from disengaging with the cuff 200 at undesired angles. For example, the first forearm support 202A and the second forearm support 202B may prevent the forearm from disengaging and/or engaging the cuff 200 at one or more prohibited angles and enable the forearm for disengaging and/or engaging the cuff 200 at one or more approved angles. Thereby, enabling the user to effectively and efficiently engage and disengage the forearm with the cuff 200. Optionally, the first forearm support 202A and the second forearm support 202B can provide the same level of support to each side of the forearm of the user. The wrist support 204 can provide support medially, laterally, and/or to the top of a user's wrist. The wrist support 204 can also provide support to the user's hand, thereby preventing the wrist from moving from side to side or inadvertently disengaging with the cuff 200. In some examples, the design of the wrist support 204 enables a user to slide a flat wrist (e.g., a forearm in a supinated, pronated, or mid-prone position such that the hand and the forearm are linearly aligned) under the wrist support 204 and rotate their wrist to allow them to grab a grip. In other examples, the design of the wrist support 204 enables a user to slide a wrist into the cuff 200 at a first angle and rotate the wrist to a second angle to grab the grip. As shown in FIGS. 2A-2B, the wrist support 204 and the second forearm support 202B may provide support to the same side of the forearm of the user and the first forearm support 202A may provide support to a different side of the forearm of the user.

Each of the first forearm support 202A, the second forearm support 202B, and the wrist support 204 may include a particular profile such that varying levels of support can be provided along the length of the cuff 200. For example, one or more of the first forearm support 202A, the second forearm support 202B, and the wrist support 204 may include a curved profile. Further, one or more of the first forearm support 202A, the second forearm support 202B, and the wrist support 204 may extend more at a first section or side of the cuff 200 and extend less at a second section or side of the cuff 200. The extension of the first forearm support 202A, the second forearm support 202B, or the wrist support 204 may be in the horizontal, vertical, or any other direction. Further, the first forearm support 202A, the second forearm support 202B, or the wrist support 204 may include varying thicknesses. For example, a first portion of the first forearm support 202A may include a greater level of thickness than a second portion of a second portion of the first forearm support 202A. One or more of the first forearm support 202A and the second forearm support 202B may include a first level of thickness and/or a first flexibility and the wrist support 204 may include a second level of thickness and/or a second flexibility. Therefore, the first forearm support 202A, the second forearm support 202B, and the wrist support 204 may provide variable levels of support along the length of the cuff 200.

As seen in FIG. 2A, the cuff 200 provides a first level of support to the wrist and/or forearm of the user at section 203A of the cuff 200, a second level of support to the wrist and/or forearm of the user at section 203B of the cuff 200, and a third level of support to the wrist and/or forearm of the user at section 203C of the cuff 200. It will be understood that the cuff 200 may provide more, less, or different levels of support. One or more of the first level of support, the second level of support, or the third level of support may provide a varying amount of support for a particular section of the cuff 200. For example, the second level of support provides a varying level of support at section 203B of the cuff 200. Further, a greater level of support is provided at a first end of the section 203B (e.g., the end proximate to the section 203A) and a lesser level of support is provided at a second end of the section 203B (e.g., the end proximate to the section 203C).

As seen in FIGS. 2A and 2B, the first forearm support 202A and the second forearm support 202B extend at least partially along the sides of the cuff 200. Further, the first forearm support 202A and the second forearm support 202B extend at least partially over the top of the cuff 200. The partial extension over the top of the cuff 200 allows for the engagement of the forearm with the cuff 200. In some embodiments, the first forearm support 202A and the second forearm support 202B may not extend over the top of the cuff 200. Further, as shown, the wrist support 204 has a half or partial ring shape. In other examples, the wrist cuff 200 and/or the first forearm support 202A and the second forearm support 202B can have a full ring shape.

One of ordinary skill in the art would appreciate the vast number of ways in which the levels of the support offered by the cuff 200 can vary. For instance, in some examples, different levels of support can be provided to each side of the forearm of the user and/or the same level of support can be provided to side of the wrist of the user.

Contoured Handle

Figure 3A:
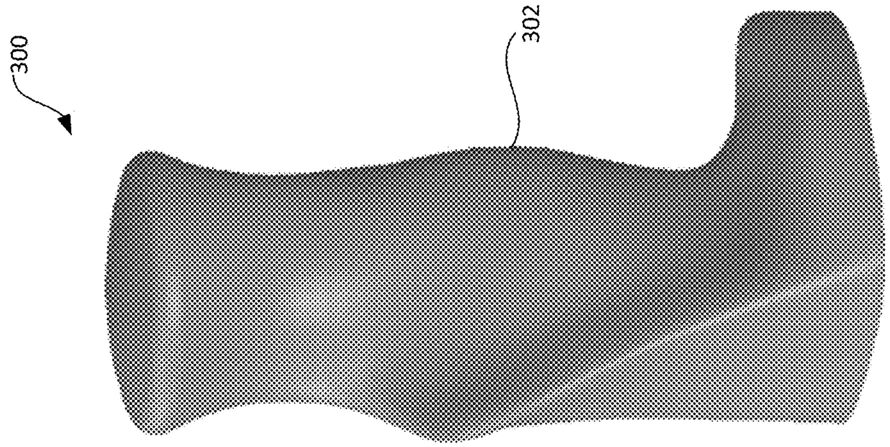
FIGS. 3A-3C illustrate a rear, top and front side views, respectively, of a contoured handle that can be attached to the proximal portion of the crutch of FIG. 1.
Figure 3B:
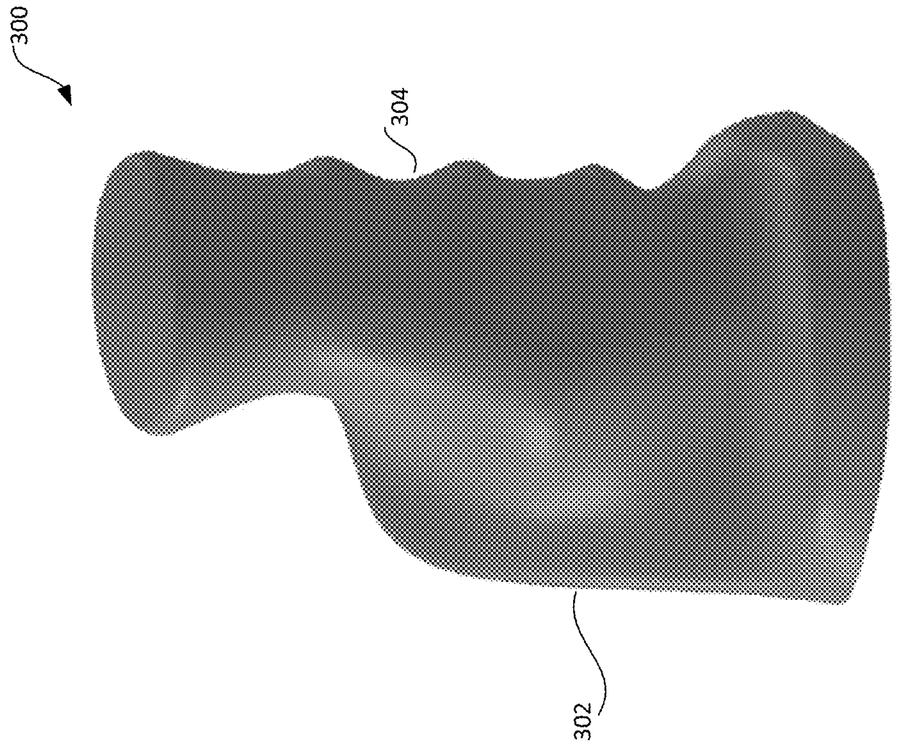
Figure 3C:
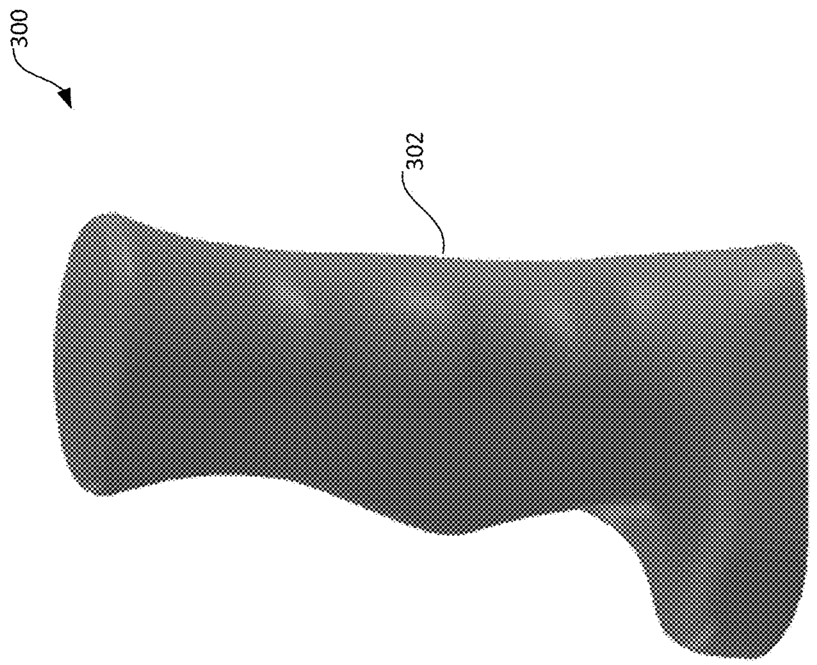

FIGS. 3A-3C illustrate perspective views of a contoured handle 300 that can be attached to the proximal portion of the crutch 100 of FIG. 1. The contoured handle 300 can be contoured or grooved to fit a hand or fingers of a user such that the contoured handle 300 provides an anatomical fit of the user's hand. In other examples, the contoured handle 300 is not contoured but instead is generally cylindrical in shape and/or form. The contoured handle 300 can be made of material that prevents or partially inhibits the hand from slipping off the hand grip. The contoured handle 300 can allow for the user to establish a firmer grasp of the contoured handle 300. The contoured handle 300 can include a natural position to place the thumb. This natural position can be identified by the portion of the contoured handle 300 that extends away from a central axis of the contoured handle 300. The portion of the contoured handle 300 for the placement of the thumb can prevent slippage of the hand during use of the contoured handle 300. The contoured handle 300 further can include a contoured surface for natural placement of the palm of the user. Each of the bumps or ridges allows for the user to establish a firm and consistent grip of the contoured handle 300.

In the example of FIGS. 3A-3C, the contoured handle 300 includes a palm support 302 and a finger support 304. It will be understood that the contoured handle 300 may include more, less, or different supports. For example, the contoured handle 300 may include an additional support to support a thumb of the user. Optionally, the palm support 302 and the finger support 304 can be part of a single unitary (e.g., monolithic or seamless) piece that can couple to a proximal end of the crutch body or a cuff of the crutch body. In some embodiments, the unitary piece can slidably couple to the cuff or the proximal end of the crutch body. In other embodiments, the unitary piece can engage with the cuff or the proximal end of the crutch body via a bolt or a shaft on cuff or the crutch body. Further, optionally, the palm support 302 and the finger support 304 can be distinct supports that can couple together to form the contoured handle 300.

Further, in the example of FIGS. 3A-3C, the contoured handle 300 is molded to match the shape of a hand of a user. For example, the palm support 302 can be similar to or match the palm of a user and the finger support 304 can be similar to or match the fingers of the user. Therefore, the contoured handle 300 can allow for efficient engagement and disengagement with the hand of the user. By including a palm support 302 and a finger support 304, the user can establish a natural and firm connection with the contoured handle 300. In some embodiments, the contoured handle 300 may be hand specific. For example, a first contoured handle may be compatible with a left hand of the user and a second contoured handle may be compatible with a right hand of the user. Further, the contoured handle 300 may match the hand of a specific user. In other embodiments, the contoured handle 300 may be a general handle that is compatible and/or matches with multiple hands (e.g., both a right hand and a left hand, hands of multiple users, etc.). Therefore, the contoured handle 300 can be molded to match the shape of the hand of the user.

In some embodiments, the contoured handle 300 is made of a resilient (e.g., flexible) material that resiliently supports the user's wrist. For example, the contoured handle 300 can include overmolded plastic, metal, carbon fiber, or composite material, to name a few. In addition or alternatively, the contoured handle 300 can include a flexible or soft outer shell which can include, for example, ethylene-vinyl acetate ("EVA"), silicone, or rubber. The contoured handle 300 can work in tandem with the cuff 200 to provide an enveloping system that advantageously reduces strain or fatigue on the forearm, the hand, and/or the wrist.

Optionally, the contoured handle 300 may include a wrist support member that provides additional levels of support to the wrist of the user. For example, the inner side of the user's arm can rest on the wrist support member, thereby allowing the user's hand and wrist to be supported by the enveloping structure of the wrist support member. For example, the wrist support member can be contoured to comfortably receive a palm of the user. In some embodiments, the wrist support member includes a structure which can help retain the hand on the handle but will not restrict a user from removing his hand from the crutch. Advantageously, the wrist support member allows the user to hold onto the crutch without having to grab or hold the handle tightly during use, thereby allowing the user to hold onto the crutch in a more relaxed manner and reducing strain and fatigue on the user's hands during use of the crutch.

Handle Including a Grip and Shaft

Figure 4:
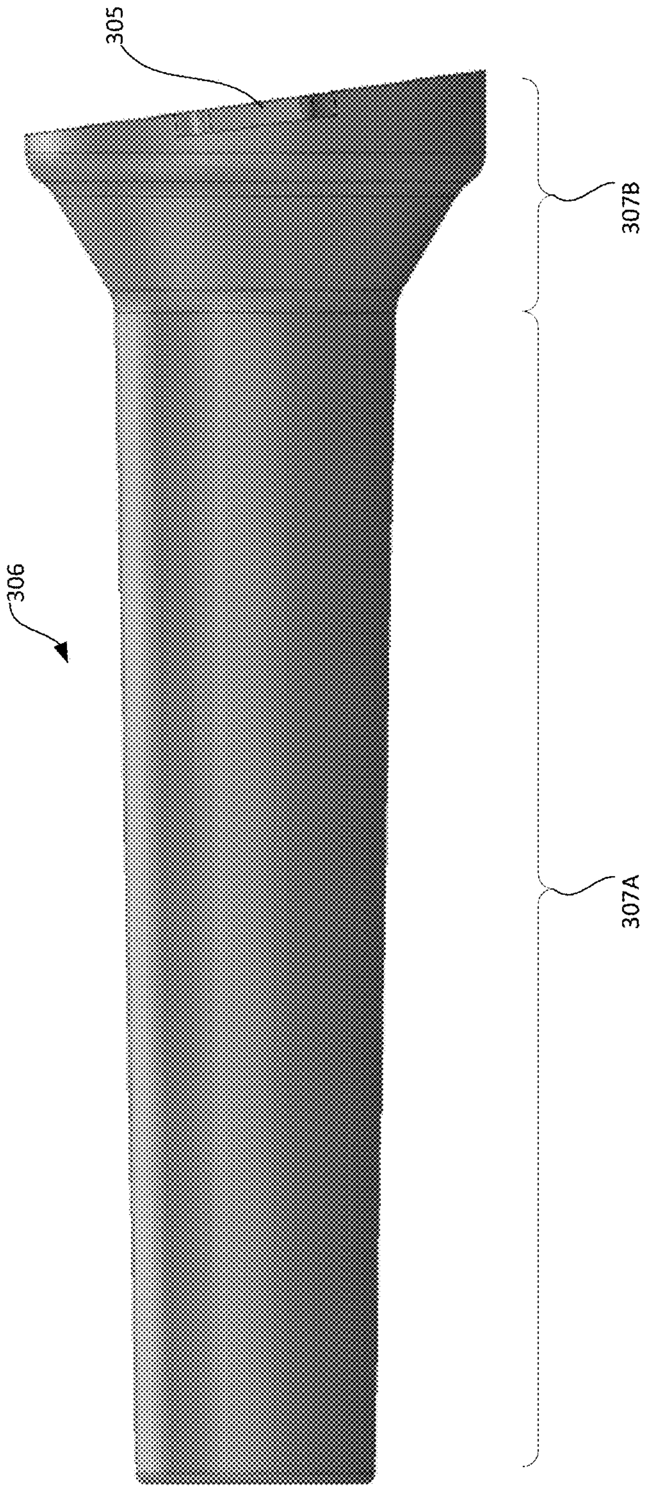
FIG. 4 illustrates a side view of a shaft of the crutch that can be attached to a grip, according to some embodiments.

FIG. 4 illustrates a shaft 306 of the crutch 100 that can be attached to a grip, according to some embodiments. The shaft 306 can include a first portion 307A that can engage with a grip and a second portion 307B that can engage with a portion of the crutch (e.g., the proximal portion of the crutch, a portion of the proximal portion of the crutch, etc.). In some embodiments, the second portion 307B of the shaft 306 may engage with a portion of the cuff 200. The second portion 307B of the shaft 306 may engage with the crutch or the cuff via one or more connections or fasteners. For example, the second portion 307B of the shaft 306 may engage with a slot, an indentation, a cavity, or another portion of the cuff or the crutch. Optionally, the second portion 307B of the shaft 306 may be part of a single unitary (e.g., monolithic or seamless) crutch or cuff or a single unitary portion of the crutch or the cuff. Therefore, the shaft 306 may engage with the crutch or the cuff via the second portion 307B of the shaft.

The first portion 307A of the shaft 306 may engage with a portion of a grip. The first portion 307A of the shaft 306 may be a universal adapter. For example, the first portion 307A of the shaft may engage with multiple different grips. A user may be able to select any number of grips and alternatively engage and disengage each grip with the shaft 306, and, therefore, the crutch. Such a configurable nature of the crutch allows the user to determine the correct grip to meet the specific needs of the user. For example, one user may prefer a cylindrical grip and another user may prefer a contoured grip and, using the shaft 306, each user may modify the crutch to include the desired grip. Further, such a configurable nature allows the same crutch to be used with different grips. This further allows the grip of the crutch to be changed as the requirements of the user change.

As seen in FIG. 4, the first portion 307A of the shaft comprises a cylindrical portion. It will be understood that the first portion 307A may be any shape or design. For example, the first portion 307A may include a triangular portion, a rectangular portion, etc. Further, the first portion 307A may include any number of faces or sides of the first portion 307A. For example, where the first portion 307A includes a rectangular portion, the first portion 307A may include four faces. Further, the first portion 307A may include multiple distinct sub-portions. For example, the first portion 307A may include multiple cylindrical portions. Therefore, the first portion 307A can be a particular shape or design.

Further, the first portion 307A may be part of a key-slot connection. For example, the first portion 307A may be the key and the grip may be the slot such that the first portion 307A engages with the grip. Further, the first portion 307A can engage (slidably or otherwise) with the grip. In some embodiments, the first portion 307A may include one or more connectors. The one or more connectors may include one or more indentations, rails, cavities, or other connectors to connect with the grip. The one or more connectors may ensure that when the first portion 307A is engaged with a grip, the grip is unable to twist relative to the shaft 306. Further, each of the one or more connectors may include a further indentation. The further indentation may allow the first portion 307A and the grip to engage and be locked in place such that the first portion 307A and the grip cannot be removed without an increased effort. Further, the first portion 307A and the grip may be locked in engagement via one or more locks to prevent unintentional disengagement.

Therefore, the key-slot connection of the first portion 307A may allow the first portion 307A and the grip to be slidably engaged.

The shaft 306 may further include an engagement portion 305. It will be understood that the shaft 306 may include more, less, or different engagement portions 305 which may be distributed along the second portion 307B of the shaft 306. The engagement portion 305 can engage with all or a portion of the grip to lock the grip into place on the shaft 306 and/or prevent the grip from rotating relative to the shaft 306.

Figure 5:
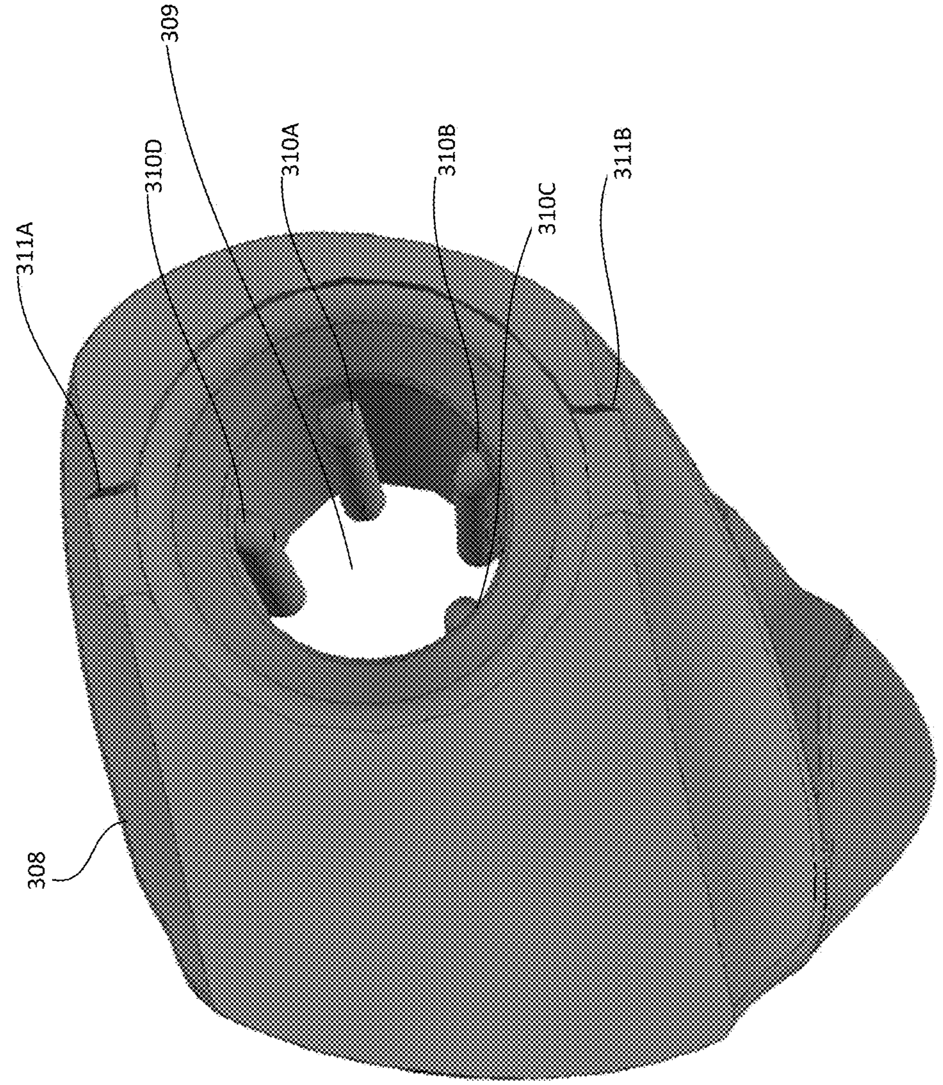
FIG. 5 illustrates an end view of a grip that can be attached to the shaft of FIG. 4.

FIG. 5 illustrates an end view of a grip 308 that can be attached to the shaft 306 of FIG. 4. The grip 308 can include a cavity 309 that can engage and disengage with the shaft. As seen in FIG. 5, the cavity 309 can be a full cavity that extends entirely through the grip 308. In some embodiments, the cavity 309 can be a partial cavity that extends at least partially through the grip 308. The cavity 309 may include one or more connectors 310A-310D that can engage and disengage with the connectors of the shaft. The connectors 310A-310D can be protrusions that extend from an inner surface of the cavity 309 and that can optionally engage with recesses or slots in the shaft 306. In another embodiment, the connectors 310A-310D can be recesses in the inner surface of the cavity 309 that can optionally engage with protrusions on a surface of the shaft 306. It will be understood that the cavity 309 may include more, less, or different connectors. Optionally, the cavity 309 may not include any connectors 310A-310D. In some embodiments, one or more of the connectors 310A-310D may engage with the shaft and one or more of the connectors 310A-310D may not engage with the shaft. For example, connectors 310B and 310D may be engaged with the shaft and connectors 310A and 310C may not be engaged with the shaft. Such a configurable engagement allows the orientation of the grip to be modified based on which connectors 310A-310D of the grip are engaged. For example, by modifying which connectors 310A-310D are engaged with the shaft, the grip may be moved (e.g., rotated) ninety degrees, forty-five degrees, or any number of degrees.

As seen in FIG. 5, the grip 308 can further include engagement portions 311A and 311B. The engagement portions 311A and 311B can engage with at least a portion of the shaft in order to prohibit or limit movement, rotation, or disengagement of the grip 308 relative to the shaft 306. The engagement portions 311A and 311B can engage with the engagement portion 305 of FIG. 4. It will be understood that the grip 308 can include more, less, or different engagement portions 311A and 311B. Therefore, the grip 308 may include a cavity 309 and one or more engagement portions 311A and 311B to enable the grip 308 to engage with a shaft.

Figure 6A:
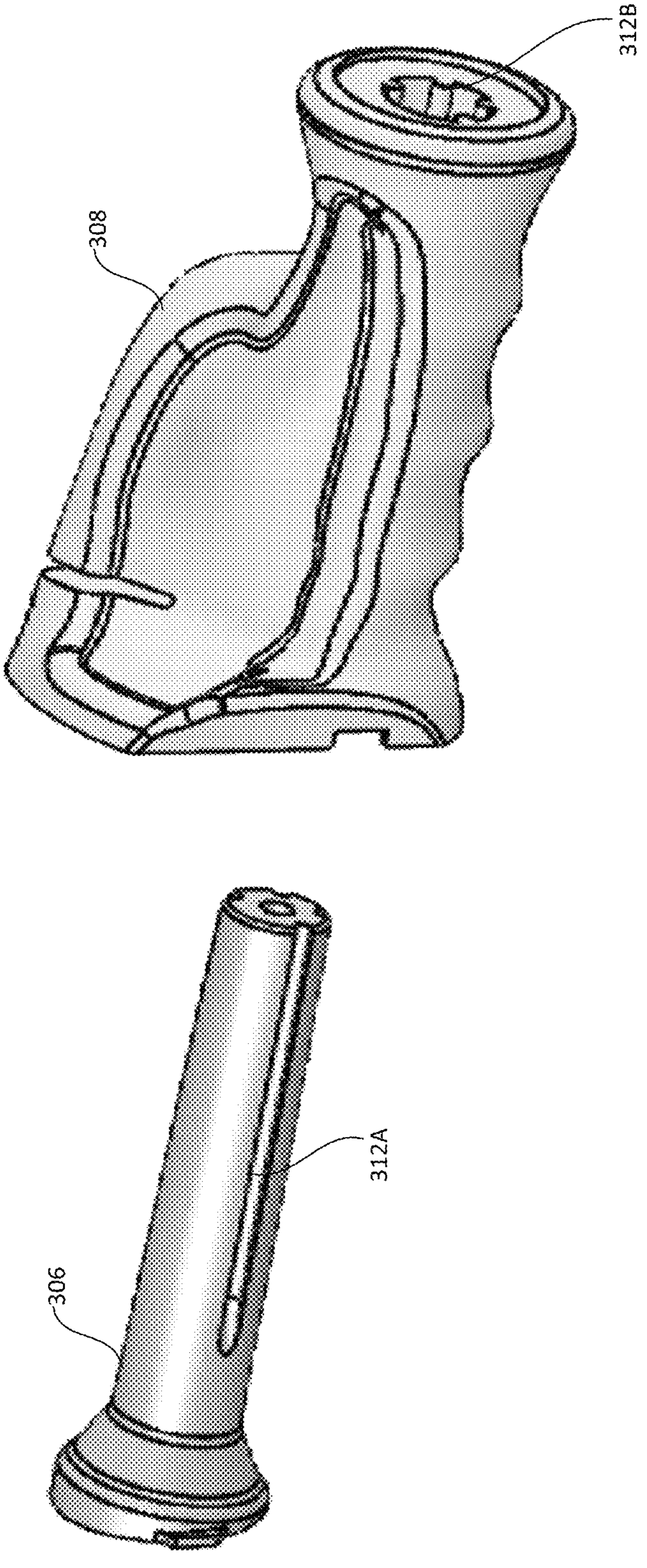
FIG. 6A illustrates an exploded view of a grip and a shaft that can be engaged to define a handle.

FIG. 6A illustrates a grip 308 and a shaft 306 that can engage. For example, the grip 308 and the shaft 306 can be slidably engaged. As seen in FIG. 6A, the grip 308 can include a cavity that extends fully through the grip 308. Optionally, the cavity of the grip 308 may extend partially through the grip 308. The cavity may receive the shaft 306 to ensure that the orientation of the grip is properly maintained. In some embodiments, each end of the cavity can receive the shaft 306 and, therefore, the orientation of the grip 308 may be modified based on which orientation is used. For example, the user may connect the shaft 306 to the grip 308 such that either end of the grip 308 may be considered the "top" of the grip 308 (e.g., the portion of the grip 308 located furthest from the crutch).

The shaft 306 may include one or more connectors 312A and the cavity of the grip 308 may include one or more connectors 312B. The connectors 312A and 312B may be one or more of indentations, cavities, recesses, protrusions, rails, or other physical connectors. The engagement of the connectors 312A and the connectors 312B may lock the grip 308 into place. The shaft 306 and/or the grip 308 may include any number of connectors 312A, 312B. In some embodiments, the shaft 306 and the grip 308 may include the same number of connectors 312A, 312B. In other embodiments, the shaft 306 and the grip 308 may include a different number of connectors 312A, 312B. Engagement of the connectors 312A of the shaft 306 with the connectors 312B of the grip 308 may result in the engagement of the shaft 306 with the grip 308. Further, engagement of the connectors 312A of the shaft 306 with the connectors 312B of the grip 308 may lock the rotation of the grip 308 with respect to the shaft 306.

Figure 6B:
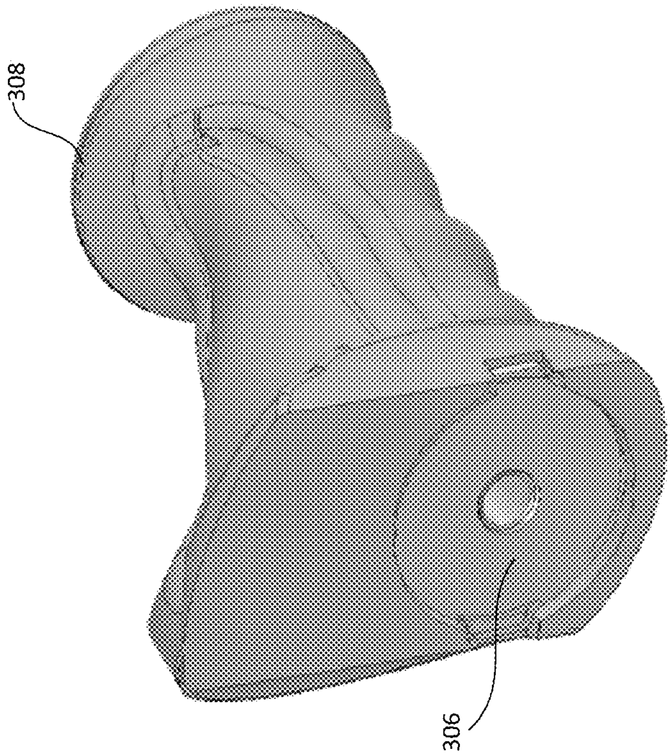
FIGS. 6B-6D illustrate a perspective end view and cross-sectional views, respectively, of an engagement of the shaft of FIG. 4 and the grip of FIG. 5.
Figure 6C:
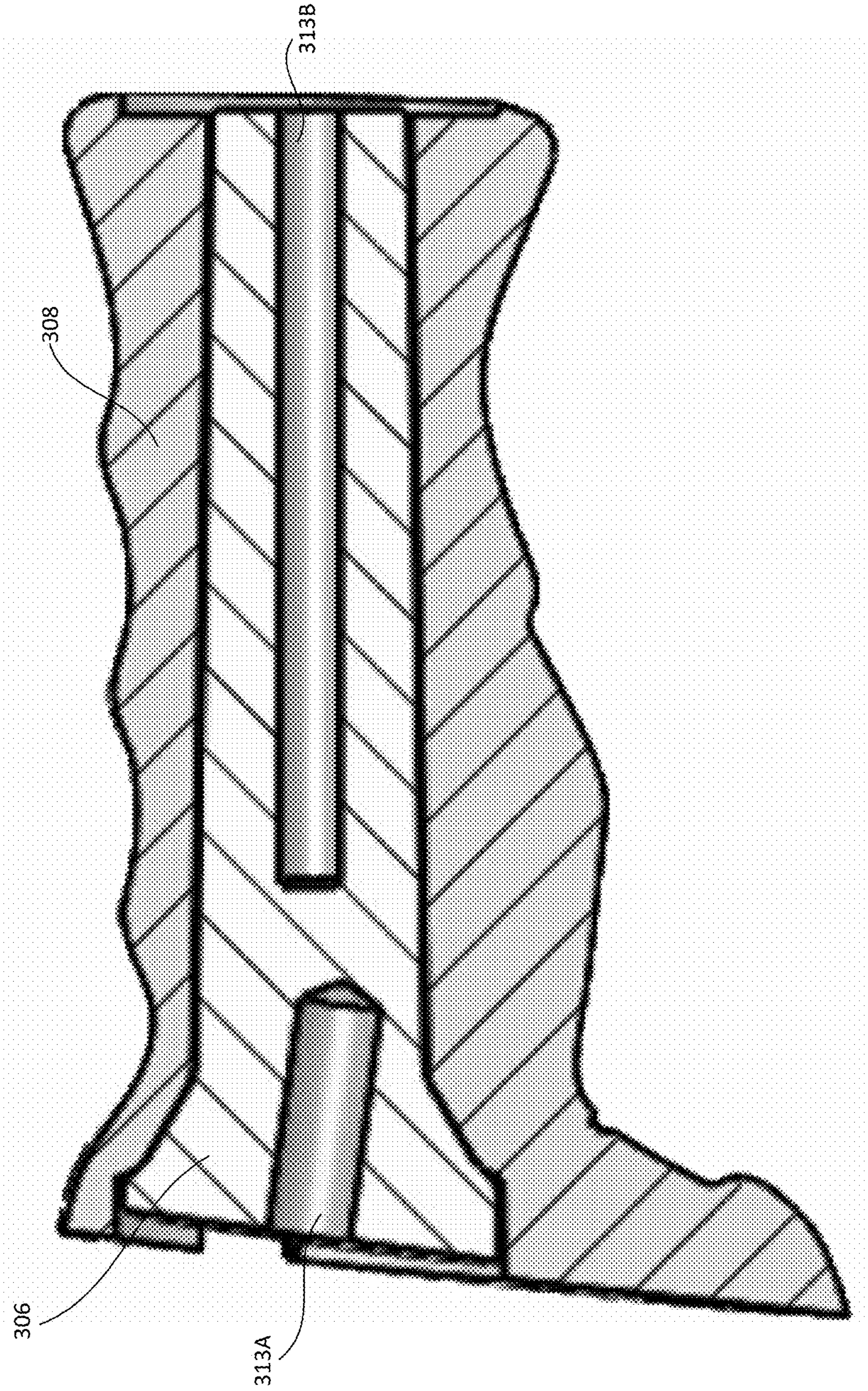
Figure 6D:
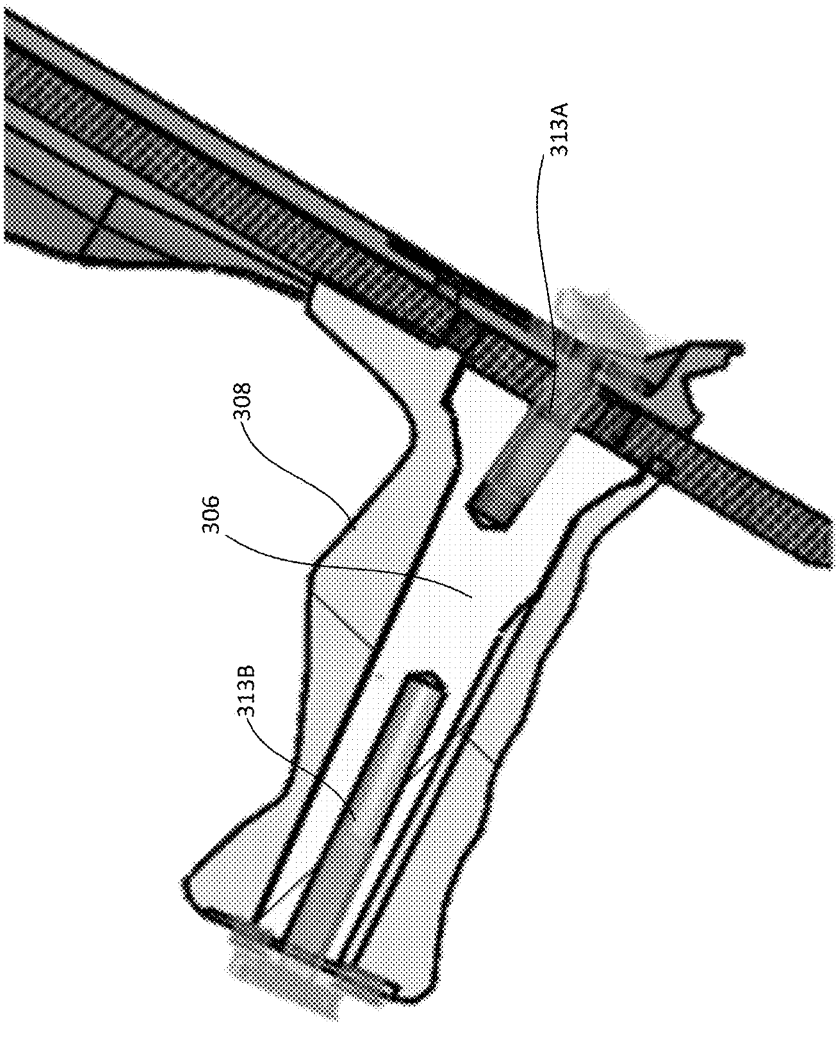

FIGS. 6B-6D illustrate perspective view of an engagement of the shaft of FIG. 4 and the grip of FIG. 5. FIG. 6B further illustrates a rearview of the engagement of the shaft 306 and the grip 308. As seen in FIG. 6B, in order to engage the shaft 306 and the grip 308, connectors of the shaft 306 and connectors of the grip 308 have been engaged. Further, engagement of the shaft 306 and the grip 308 can be seamless such that the shaft 306 can fully be inserted and/or engaged with the grip 308. The engaged shaft 306 and grip 308 may further be engaged with a portion of the crutch (e.g., the proximal portion of the crutch, the cuff of the crutch, etc.) to provide a crutch with a modifiable grip 308.

FIGS. 6C-6D illustrates another a view of the engagement of the shaft 306 and the grip 308. As seen in FIGS. 6C-6D, the shaft 306 and the grip 308 can be fully engaged. The grip 308 may comprise a first material. The grip 308 may further comprise a soft, outside shell. For example, the grip 308 may be an EVA anatomical shell. It will be understood that the grip 308 can be a softer, outside shell comprising any material. Further, the shaft 306 may comprise a second material. The shaft 306 may further comprise a hard, inner shaft. The first material and the second material may comprise different materials with varying levels of thickness, density, pliability, flexibility, durability, support, malleability, etc. The shaft 306 may further include a first cavity 313A and a second cavity 313B. The first cavity 313A may connect the shaft 306 to the crutch via a screw, bolt, etc. The second cavity 313B may connect the cuff to the crutch via a screw, bolt, etc. It will be understood that the shaft 306 may include more, fewer, or different cavities. Therefore, the shaft 306 and the grip 308 can be engaged in order to provide various modular capabilities for the crutch.

Grip with Hinge for Flexion

FIGS. 7A-7D illustrate perspective views of a contoured handle 300 of FIGS. 3A-3C with a flexion feature, according to some embodiments. Such a flexion feature can provide increased comfort to the user during use of the contoured handle 300, which can advantageously improve the user's experience. At least a portion of the contoured handle 300 (e.g., a portion of the handle that supports the palm of the user's hand) may flex in order to provide the flexion feature of the contoured handle 300. For example, the portion of the contoured handle 300 may comprise a hinge 314 that can flex responsive a force applied. Further, the handle 300 may include one or more hinges 314 that allow a portion of the handle 300 to move or flex relative to other portions of the handle 300. Based on one or more features of the hinge 314, the hinge 314 may flex relative to the contoured handle 300.

Figure 7A:
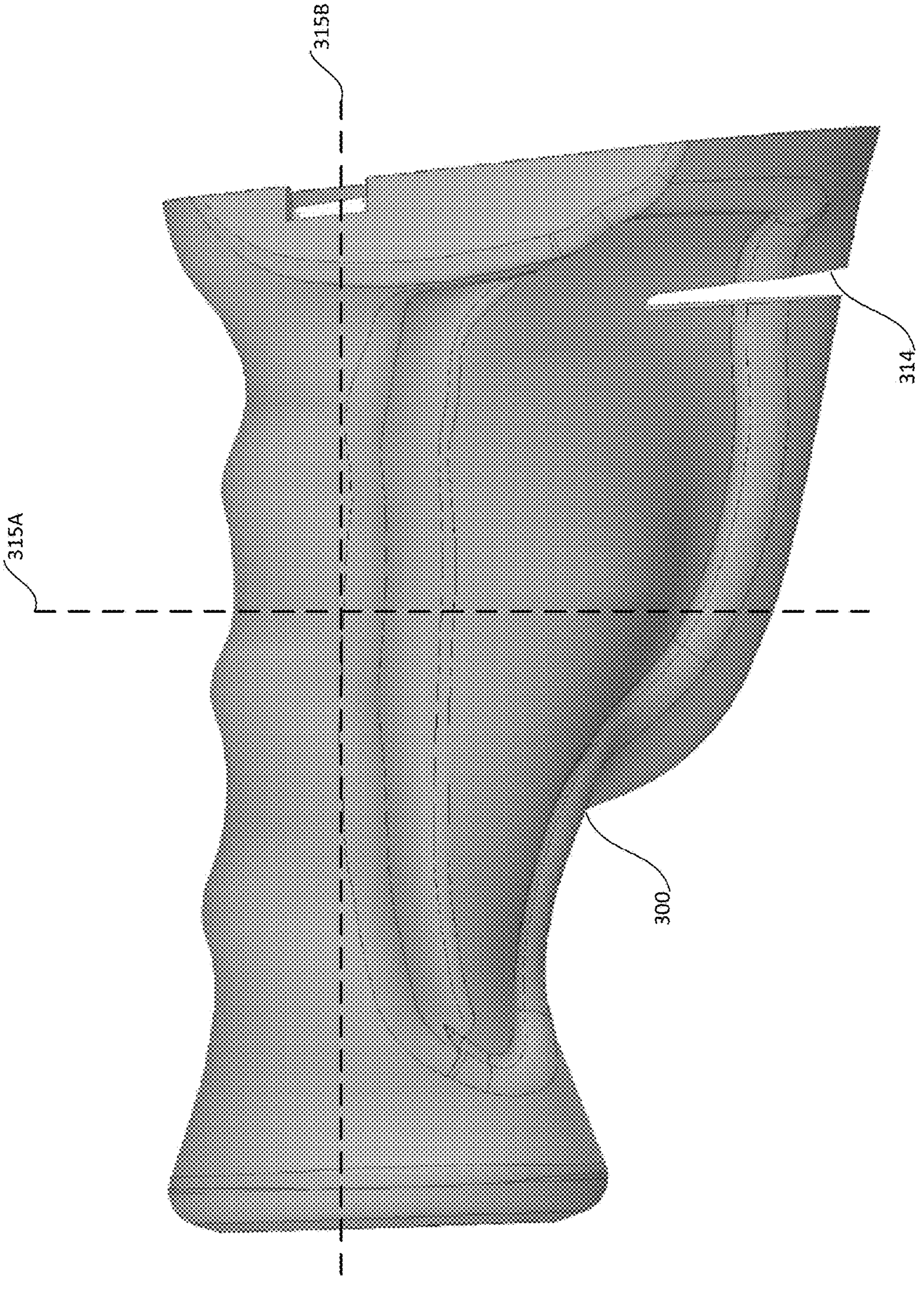
FIGS. 7A-7D illustrate a top, rear, top, and top views, respectively, of a contoured handle of FIGS. 3A-3C that have a flexion feature, according to some embodiments.
Figure 7B:
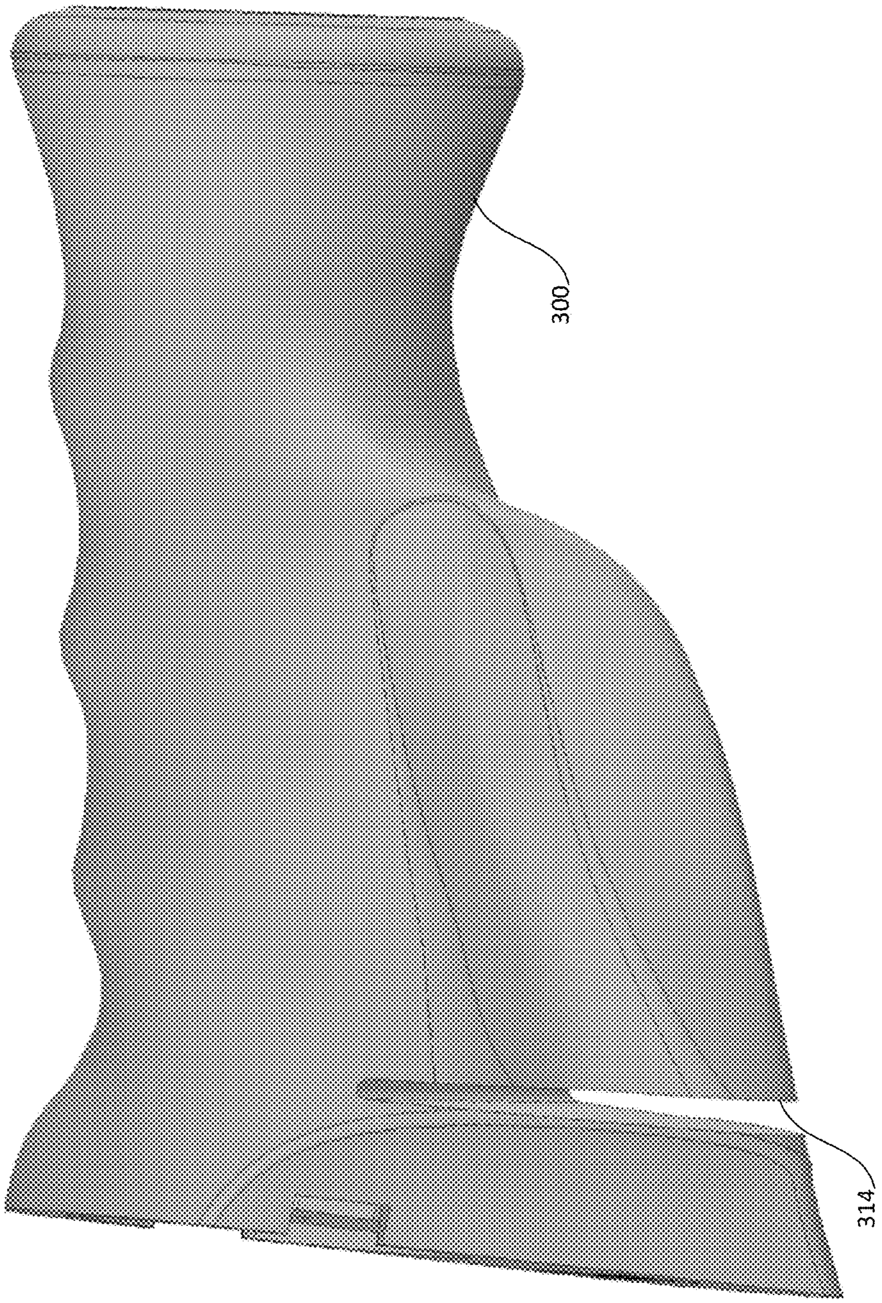

As seen in FIGS. 7A-7B, the contoured handle 300 may include a hinge 314 in order to provide the flexion feature of the contoured handle 300. The hinge 314 can be located at one or more locations of the contoured handle 300. Further, the hinge 314 can be oriented in any direction relative to the contoured handle 300. For example, as seen in FIG. 7A, the contoured handle 300 may be oriented along a first axis 315A and a second axis 315B. The first axis 315A may be a y-axis and the second axis 315B may be an x-axis. The hinge 314 may extend in the direction of (e.g., parallel or transverse to) one or more of the first axis 315A or the second axis 315B. It will be understood that the hinge 314 may extend in any direction relative to one or more of the first axis 315A or the second axis 315B including a diagonal direction. Further, in some embodiments, the contoured grip 300 may include multiple hinges 314. For example, the contoured grip 300 may include a first hinge 314 that extends in a first direction (e.g., the first axis 315A) and a second hinge that extends in a second direction (e.g., the second axis 315B). Therefore, the contoured handle 300 can include a flexion feature that enables a portion of the contoured handle 300 to flex relative to another portion of the contoured handle 300.

As seen in FIGS. 7A-7B, in some embodiments, the hinge 314 may include a slot to enable the flexion feature. The slot may be a cavity that extends fully in one or more directions relative to the contoured grip 300 and extends partially in one or more directions relative to the contoured grip 300. As seen in FIG. 7A, the slot extends partially through the contoured grip 300 along the first axis 315A and the second axis 315B, but extends fully through the contoured grip 300 along a third axis (into the page) with respect to the contoured grip 300. For example, the slot can extends partially with regards to height and/or width and extend fully with regards to the depth of the contoured grip 300. It will be understood that the slot may extend fully and/or extend partially in any direction. Therefore, the hinge 314 may include a slot to enable the flexion feature.

Figure 7C:
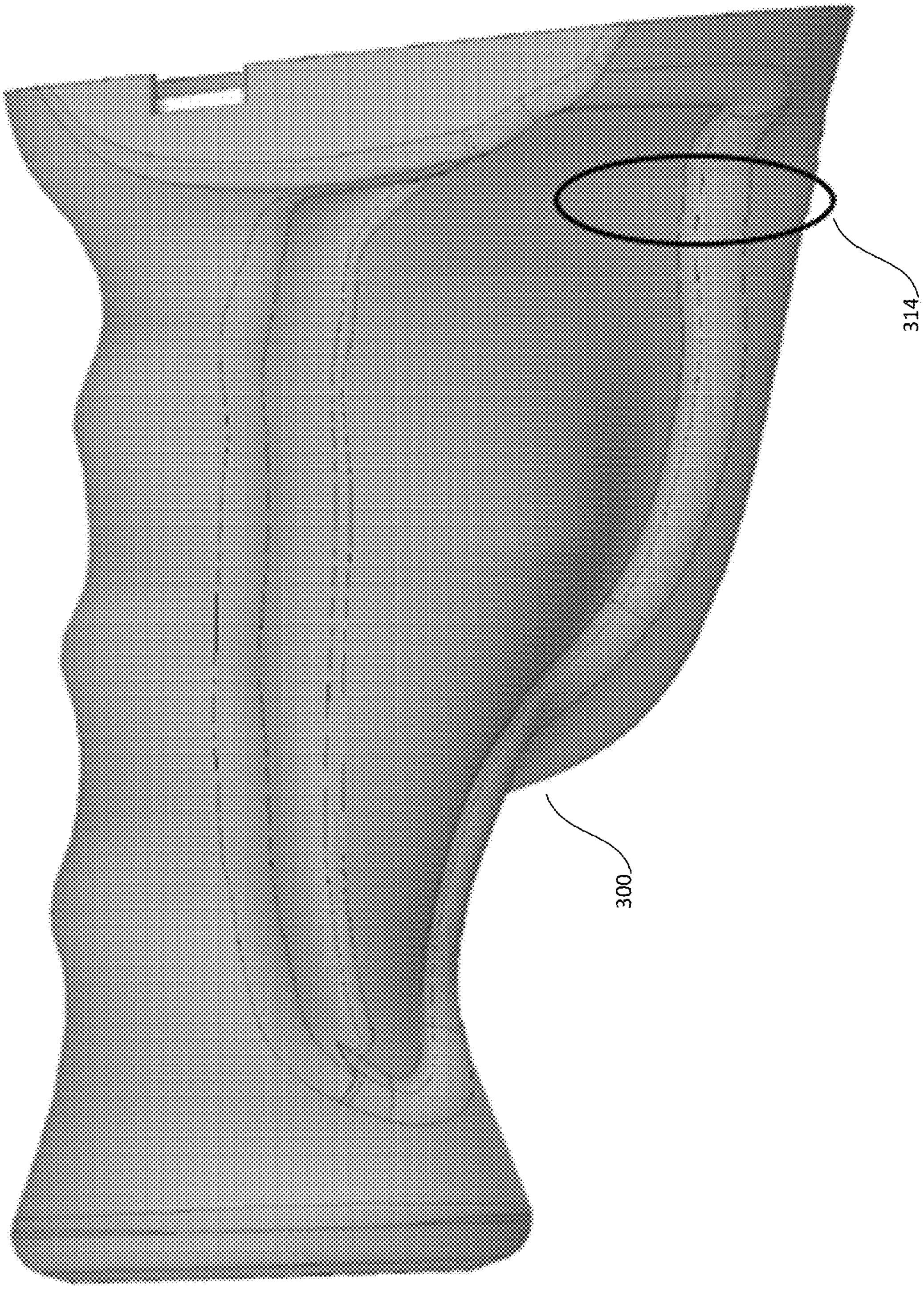

In some embodiments, the hinge 314 may include a slot that forms a cavity that extends partially in one or more directions relative to the contoured grip 300. For example, as seen in FIG. 7C, the cavity may extend fully through the contoured grip 300 with respect to one or more directions. Further, the slot may extend partially through the contoured grip 300 along a first axis, a second axis, and a third axis. By extending partially through the contoured grip 300, the slot may offer flexion properties without forming a complete or total opening in the contoured grip 300. The hinge 314 may include multiple slots that extend partially through the contoured grip 300. For example, the hinge 314 may include a first slot that extends partially along a first axis and a second slot that extends partially along a second axis. Therefore, the hinge 314 may include slots that extend partially in one or more directions relative to the contoured grip 300.

In other embodiments, the hinge 314 may be a portion of the contoured grip 300 that is thinner than one or more other portions of the contoured grip 300. For example, the hinge may include a portion of reduced thickness relative to surrounding portions of the handle that enables the flexion feature. For example, the hinge 314 may be made of a different material than one or more other portions of the contoured grip 300. Further, the hinge 314 and the contoured grip 300 may be made of the same materials (e.g., rubber, plastic, etc.) and the hinge 314 may have a first thickness and one or more portions of the contoured grip 300 may have a second thickness where the second thickness is larger than the first thickness. In some embodiments, an area around the hinge 314 may be made of the second thickness such that the area around the hinge 314 is thicker than the hinge 314. In other embodiments, the thickness of the contoured grip 300 may gradually or gradiently decrease as the center of the hinge 314 is approached. For example, the edge of the hinge 314 may have a first thickness and the center of the hinge 314 may have a second thickness such that the first thickness is larger than the second thickness. Further, given the profile of the contoured grip 300, the hinge 314 may not match an expected thickness profile for the contoured grip 300. Further, the hinge 314 may include multiple portions of reduced thickness, each portion of reduced thickness extending along a particular axis (e.g., the same or a different axis) relative to the contoured grip 300. For example, the hinge 314 may include a first portion of reduced thickness extending generally along a first axis (e.g., an x-axis) and a second portion of reduced thickness extending generally along a second axis (e.g., a y-axis). By including multiple portions of reduced thickness, the hinge 314 can enable the flexion feature. Therefore, the hinge 314 may have a different thickness profile than the contoured grip 300.

Figure 7D:
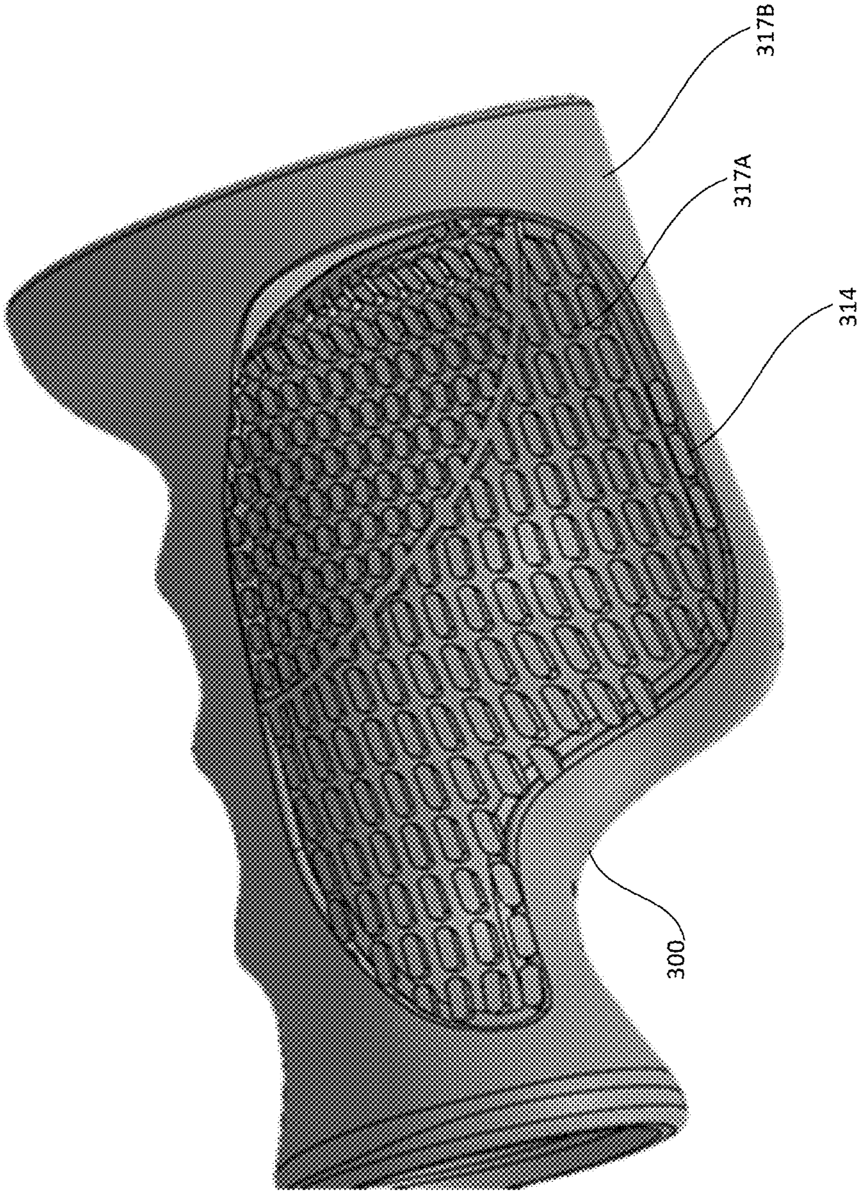

In other embodiments, the hinge 314 may have different flexion features than one or more other portions of the contoured grip 300. For example, as seen in FIG. 7D, In order to provide different flexion features, the hinge 314 may consist of a first material 317A with first flexion properties (e.g., rubber) and one or more other portions of the contoured grip 300 may consist of a second material 317B with second flexion properties (e.g., plastic). Further, the first flexion properties may enable a greater level of flexion as compared to the second flexion properties. As the contoured grip 300 includes different materials with different flexion properties, the hinge 314 can flex relative to the one or more other portions of the contoured grip 300. Therefore, the hinge 314 can enable flexion of the contoured grip 300 relative to the hinge 314 through one or more features of the hinge 314.

Adapter and Recess for Additional Functionality

Figure 8A:
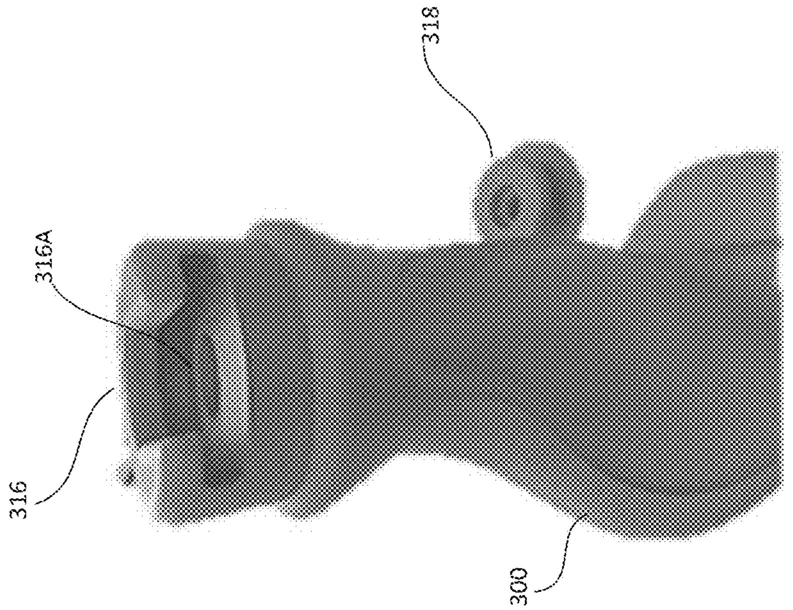
FIG. 8A illustrates a partial view of a contoured handle with a recess that attaches to an adapter, according to some embodiments.

FIGS. 8A-8D illustrate a contoured handle 300 with a connector 316 and a recess 316A that receives at least a portion of an adapter 318, according to some embodiments. The contoured handle 300 can include a connector 316 that has a recess 316A located at one or more portions of the contoured handle 300. For example, as seen in FIG. 8A, the contoured handle 300 can include a connector 316 located at a first end of the contoured handle 300. It will be understood that the contoured handle 300 can include a connector 316 located at any location along the contoured handle 300. The connector 316 can include a recess 316A (e.g., an opening or aperture) to receive at least a portion of one or more adapters 318. The recess 316A may include a specific design based on the design of the adapter 318. For example, both the recess 316A and the adapter 318 may have a reciprocal circular profile, rectangular profile, triangular profile, or any other reciprocal profile. The adapter 318 can be slidably (e.g., horizontally) inserted into the recess 316A. In some embodiments, the adapter 318 and the recess 316A may be combined via vertical insertion or any other insertion. Further, the recess 316A can include one or more connectors that enable the one or more adapters 318 to be locked onto place. For example, the recess 316A can include connectors such that when an adapter 318 is inserted into the recess 316A, the adapter 318 requires a specific removal process for the separation of the adapter 318 and the recess 316A. Further, such a removal process may include any combination of pushing the adapter 318, twisting the adapter 318, or applying force to the adapter 318.

In some examples, the connector 316 may have one or more hooks in order to provide an item carrying function. The connector 316 can include an assortment of built-in hooks for connecting an item to the crutch and carrying the item while using the crutch 100. The built-in hooks can extend in a horizontal, vertical, or other direction from the connector 316. For example, bags may be hooked onto the built-in hooks such that the crutch 100 can carry and/or support the bags via connector 316 of the contoured grip 300 while a user is using the crutch. Such a use may allow a user of the crutch to carry bags via the crutch without requiring excessive effort to be exerted by the user, and without requiring the user to hold on to the bags with their hands, allowing the user to fully grasp the handles of the crutch 100 with their hands. Therefore, the connector 316 can include built-in hooks to support an item while a user is using the crutch.

The one or more adapters 318 may each provide additional functionality such that a first adapter may provide a first functionality and a second adapter may provide a second functionality. A user may swap out the one or more adapters 318 to enable different functionalities. One such functionality of the adapter 318 may be an item carrying function. The adapter 318 can have an assortment of built-in hooks for connecting another item to the crutch when the adapter 318 is combined with the recess 316A. Further, the one or more built-in hooks may extend in a horizontal direction from the body of the contoured grip 300 such that items can be supported using the contoured grip 300. For example, bags may be hooked onto the built-in hooks such that the crutch can carry and/or support the bags via the contoured grip 300 while a user is using the crutch. Such a use may allow a user of the crutch to carry bags via the crutch without requiring excessive effort to be exerted by the user. Therefore, the adapter 318 can include built-in hooks to support an item while a user is using the crutch.

Figure 8B:
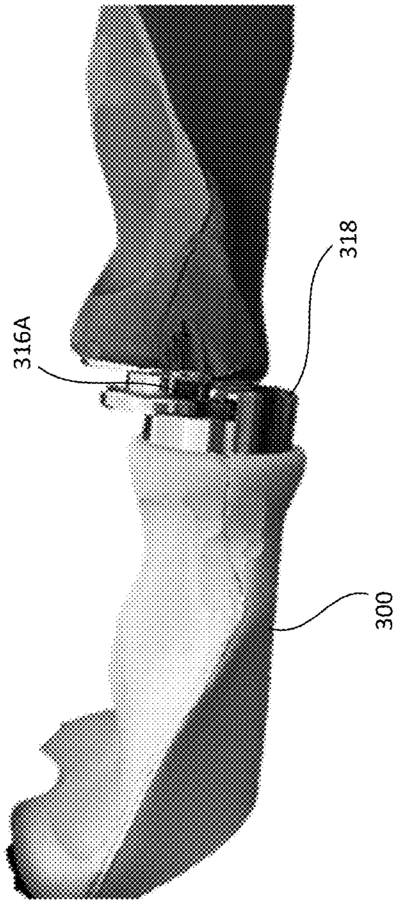
FIGS. 8B-8D illustrate perspective views of a contoured handle with a recess that attaches to an adapter that can be attached to an adapter of a second contoured handle, according to some embodiments.
Figure 8C:
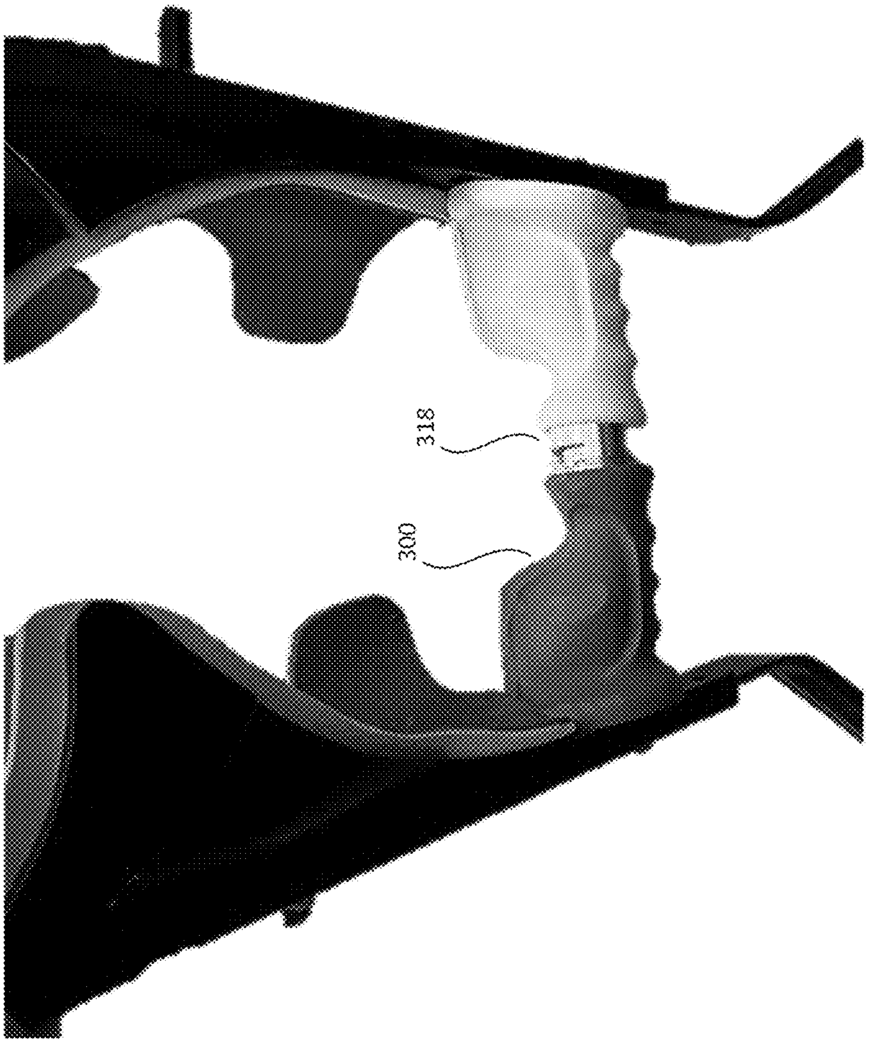
Figure 8D:
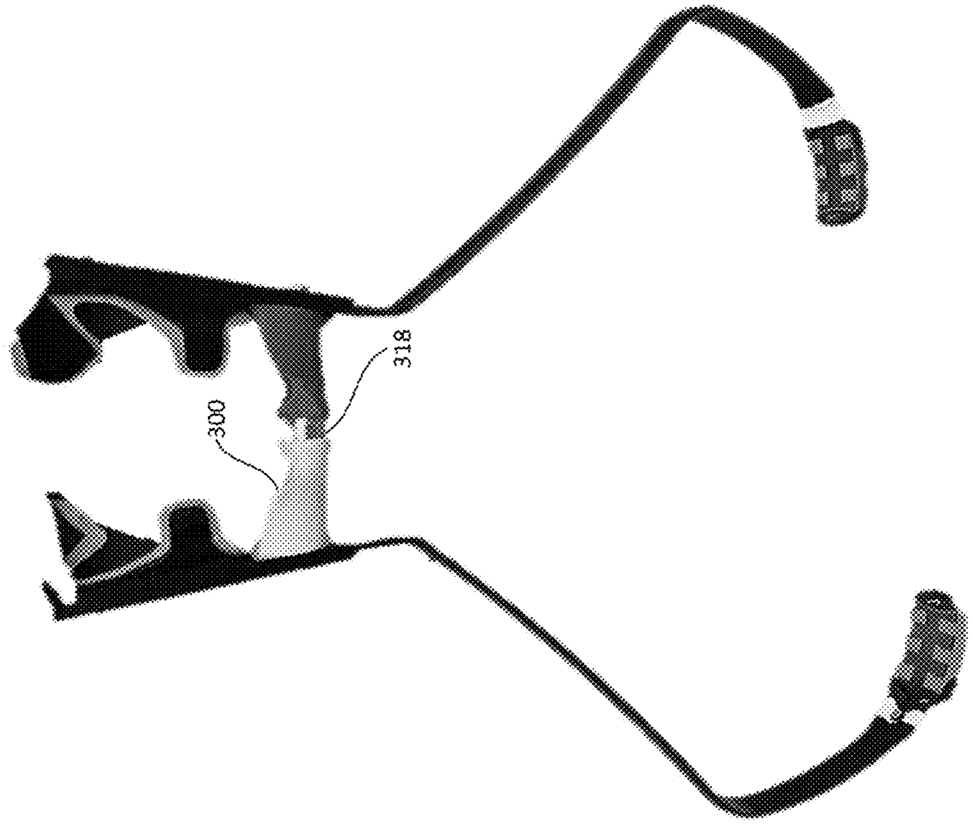

Another functionality of the adapter 318 may be an item connecting function. For example, as seen in FIGS. 8B-8D, the adapter 318 can have a first connection that can connect with a second connection of a second adapter. For example, a first crutch can include a first adapter and a second crutch can include a second adapter such that when the first adapter and the second adapter are connected and/or combined, the first crutch and the second crutch are coupled to each other. For example, a crutch for a left arm can be coupled with a crutch for a right arm using the adapter 318. By coupling the first crutch and the second crutch, the crutches can be kept together for efficient storage and/or to avoid potentially misplacing a singular crutch. Further, the coupling of the first crutch and the second crutch can result in a support. For example, when the first crutch and the second crutch are coupled via a first adapter and a second adapter, the first crutch and the second crutch form a support for a user (e.g., while standing). The support can be used to support a user prior to or after ambulation. It will be understood that the item connecting function of the adapter 318 can allow for a connection of the crutch with any other device (e.g., a support, an additional handle or grip, etc.). Therefore, the adapter 318 may provide an item connecting function.

Another functionality of the adapter 318 be a recess filling function. The adapter 318 can combine with the recess 316A without otherwise affecting the crutch or the contoured grip 300. Further, the adapter 318 can couple with the recess 316A and fill the recess 316A such that the adapter 318 and the recess 316A combine for a seamless profile (e.g., a seamless connector 316). It will be understood that the one or more adapters 318 can provide additional functionality not mentioned above. Therefore, the contoured handle 300 can have a connector 316 with a recess 316A that attaches to an adapter 318 to provide additional functionality to the contoured handle 300 and the crutch.

Height Adjustment Features

Figure 9A:
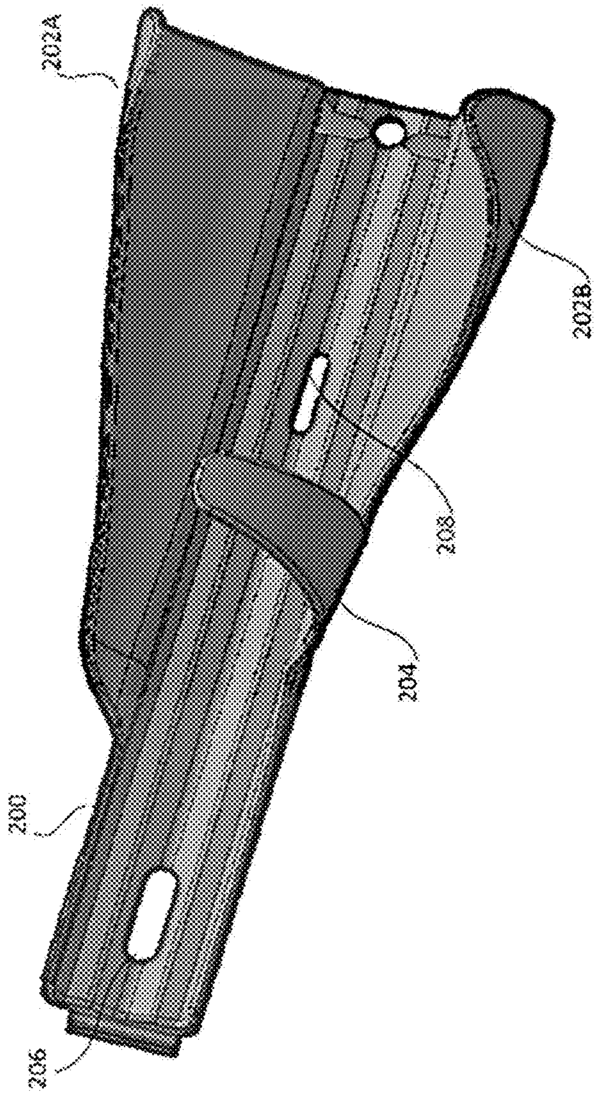
FIGS. 9A-9C illustrate perspective top, bottom, and side views, respectively, of a cuff with a height adjustment feature that can be attached to the proximal portion of the crutch body of FIG. 1, according to some embodiments.
Figure 9B:
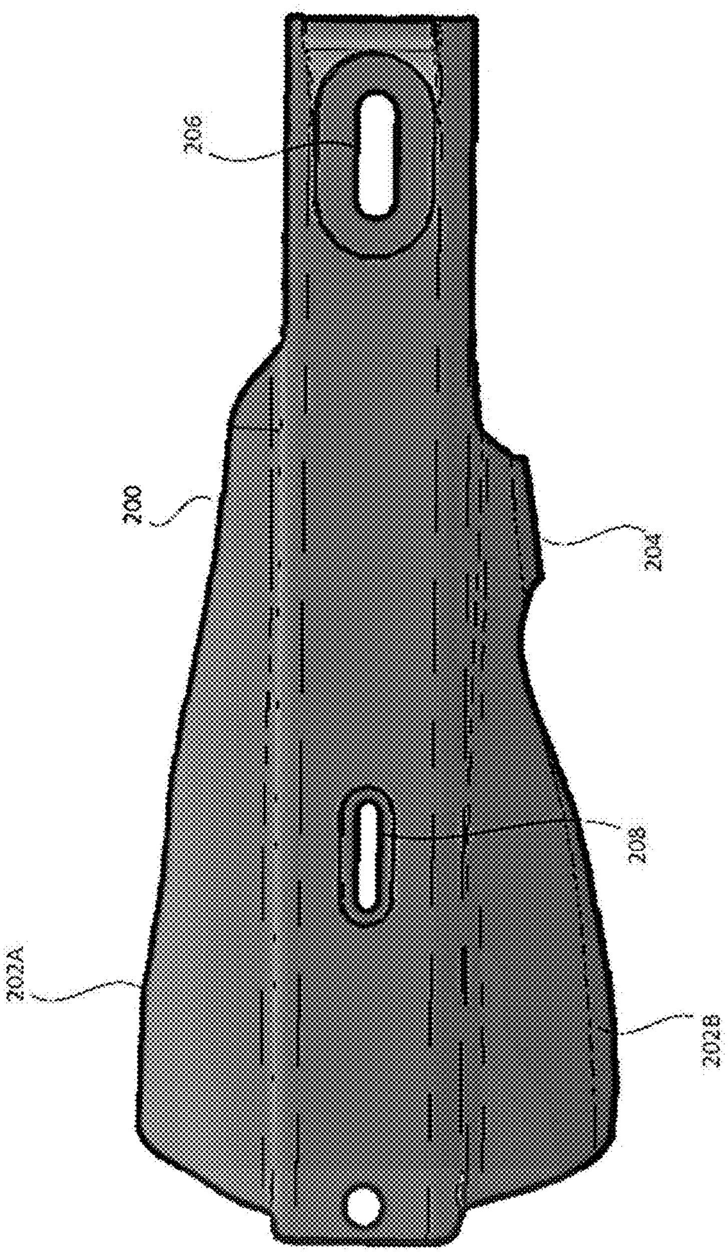
Figure 9C:
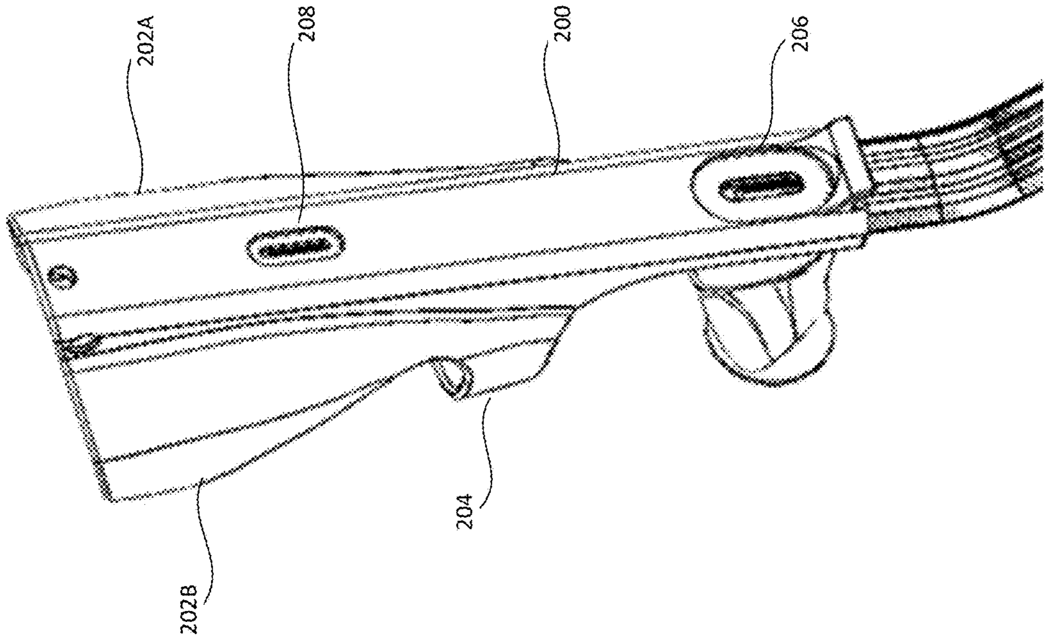

FIGS. 9A-9C illustrate a perspective view of a cuff 200 with a height adjustment feature that can be attached to the proximal portion of the crutch of Figure, according to some embodiments. The cuff 200 includes a first forearm support 202A, a second forearm support 202B, a wrist support 204, a first slot 206, and a second slot 208. It will be understood that the cuff 200 may include more, less, or different slots and/or supports.

The cuff 200 can be connected to a crutch (e.g., elongate member 102) via one or more of the first slot 206 or the second slot 208. The cuff 200 is connected to the crutch 100 such that the height of the point of the attachment of the cuff 200 to the crutch can be adjusted, thereby providing a comfortable height and/or angle for a variety of users with different preferences, different heights, different arm lengths, etc. For example, the cuff 200 can be connected to the crutch at different points along the crutch (e.g., the proximal portion of the crutch). Therefore, the height of the placement of the cuff 200 can be adjusted in order to satisfy the height needs of a user.

The cuff 200 can be connected to the crutch via one or more methods of connection. For example, as seen in FIGS. 9A-9C, the first slot 206 and the second slot 208 can be cavities within the cuff 200 and the proximal portion of the crutch may include one or more protrusions that can interact with the cavities. The first slot 206 and the second slot 208 can engage with the one or more protrusions of the crutch. For example, the crutch may include a plurality of protrusions and a user may select a particular protrusion for one or more of the first slot 206 and the second slot 208 based on the height requirements of the user. Further, the user can adjust the engagement to a different protrusion based on changing height requirements of the user (e.g., if a user grows or if the crutch is being used by a second user). The engagement of the slots and the protrusions may result in locking the cuff 200 into place. In some embodiments, the cuff 200 can include one or more cavities and the first slot 206 and/or the second slot 208 may engage with the one or more cavities. The first slot 206 and/or the second slot 208 may be engaged via a bolt that can be screwed into or unscrewed from the first slot 206 or the second slot 208 and a particular cavity on the crutch. The first slot 206 and the second slot 208 can engage with any one of a plurality of cavities on the crutch to lock or unlock the first slot 206 and the second slot 208 from the plurality of cavities. For example, a user can adjust the height of the crutch by loosening the one or more bolts disposed within the one or more slots and the cavities, sliding the cuff along the proximal portion of the crutch until the user is satisfied with the height of the crutch, and tightening the one or more bolts such that the position of the cuff 200 is locked into the desired position. Therefore, the cuff 200 can be connected to the crutch via the first slot 206 and the second slot 208.

One of ordinary skill in the art would appreciate the vast number of ways in which the height of the crutch can be adjusted via the first slot 206 and the second slot 208. For instance, in some examples, one or more of the first slot 206 or the second slot 208 can engage with the central portion (e.g., the central portion 108 in FIG. 1) or the distal portion (e.g., the curved distal portion 112 in FIG. 1) of the crutch and such engagement can be adjusted in addition to or instead of the engagement of the first slot 206 and the second slot 208 with the proximal portion (e.g., the proximal portion 104 in FIG. 1).

Friction Features

Figure 10:
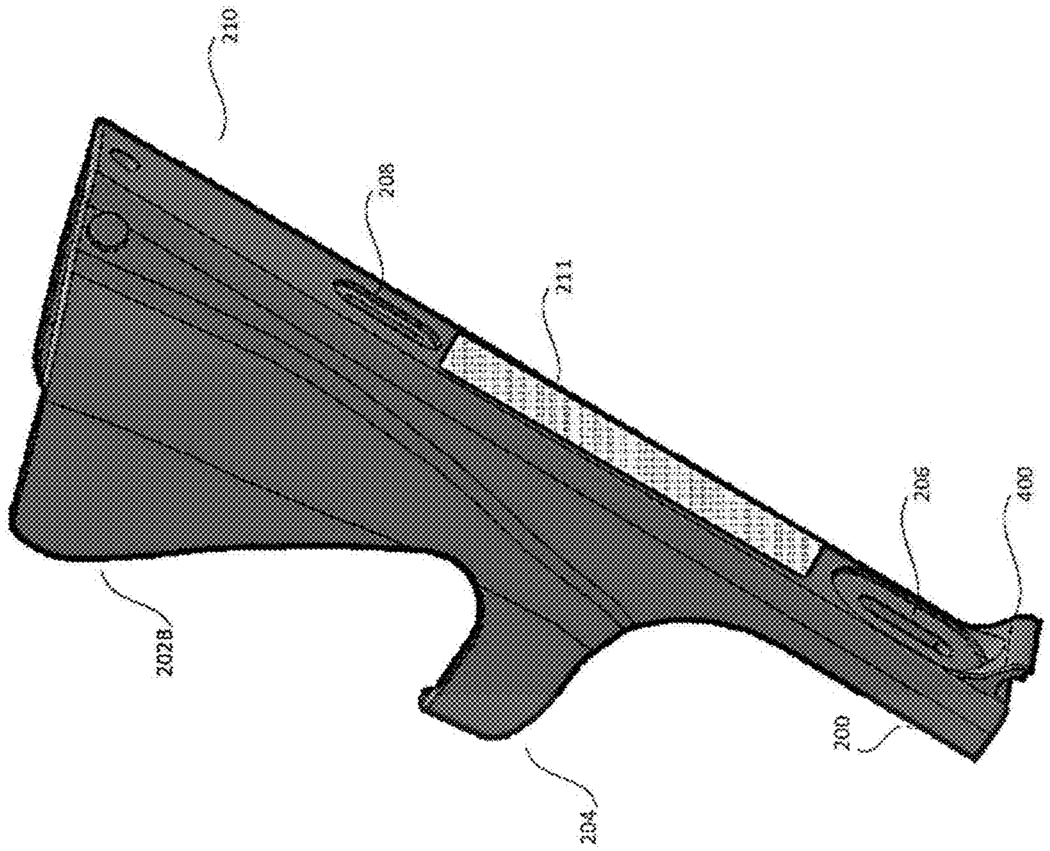
FIG. 10 illustrates a partial view of a cuff with a friction feature that can be attached to or incorporated in the proximal portion of the crutch of FIG. 1, according to some embodiments.

FIG. 10 illustrates a partial view of a cuff 200 that can be attached to the proximal portion of the crutch 100 of FIG. 1, the cuff 200 can have a friction feature 211, according to some embodiments. The friction feature 211 of the cuff 200 may inhibit (e.g., prevent) the cuff 200 (and consequently the crutch when engaged with the cuff 200) from unintentionally disengaging with a surface. For example, when the cuff 200 is placed against a wall, the friction feature 211 may prevent the cuff 200 from slipping and disengaging with the wall. Further, the cuff 200 may be connected to another device (e.g., another crutch) via the friction feature 211 in order to prevent inadvertent or unintentional disengagement by the user.

In order to provide the friction feature 211, the rear wall 210 of the cuff 200 may include one or more portions with relatively higher friction (e.g., relative to other portions of the cuff 200) that allows it to grip onto a surface (e.g., wall) that the crutch is placed against, which advantageously inhibits (e.g., prevents) the crutch from sliding off the wall and falling to the floor. The one or more portions of relatively higher friction can be made of rubber, silicone or other suitable materials with higher friction properties. In one implementation, the one or more portions of relatively higher friction are two portions of the rear wall 210 spaced apart from each other. In one implementation, a majority of (e.g., greater than 50%, greater than 75%, about 100%, 100%) of the rear wall 210 of the cuff 200 is made of the higher friction material. In one implementation, the rear wall 210 of the cuff 200 has a non-smooth texture that allows it to better grip onto a surface (e.g., a wall) that the crutch is placed against, which advantageously inhibits (e.g., prevents) the crutch from sliding off the wall and falling to the floor. Therefore, the rear wall 210 of the cuff 200 may provide a friction feature 211 that prevents the cuff (and the crutch) from disengaging with a surface. In one embodiment, friction feature 211 can be a separate component (e.g., layer of increased friction) applied to a surface of the cuff 200. In another embodiment, the friction feature 211 is defined by an integral (e.g., not separate) portion of the cuff 200.

Crutch Support

Figure 11:
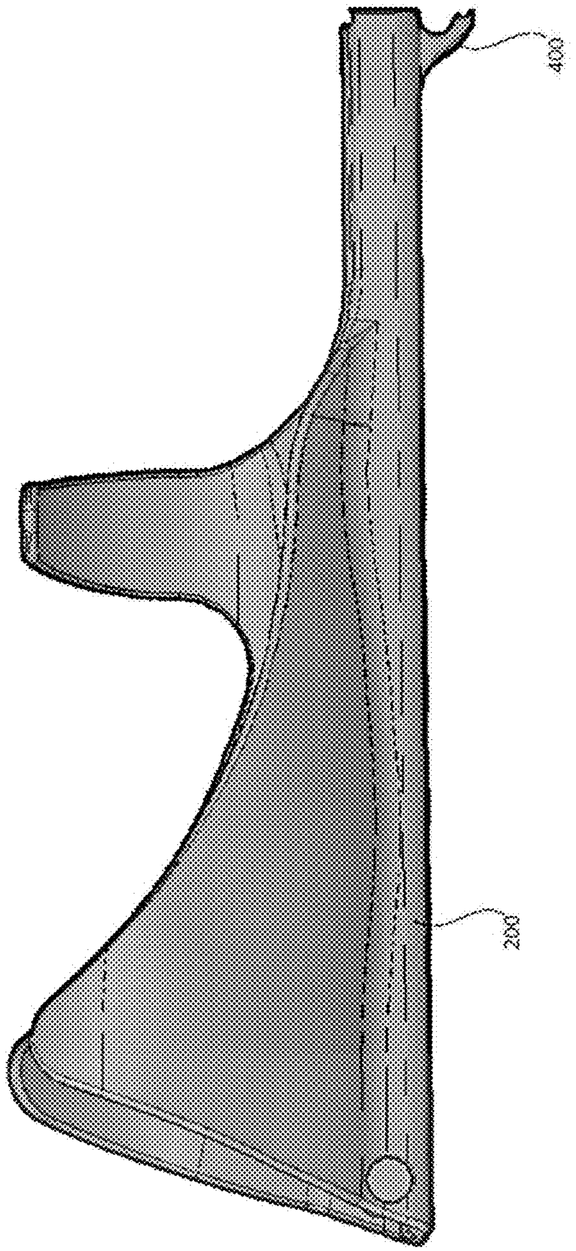
FIG. 11 illustrates a crutch support of a cuff that can be attached to the proximal portion of the crutch of FIG. 1.

FIG. 11 illustrates a crutch support 400 of a cuff 200 that can be attached to the proximal portion of the crutch of FIG. 1. The crutch support 400 enables a user to set the cuff 200 (and consequently the crutch when attached to the cuff 200) on a support (e.g., a tabletop, a rail, a chair, a shopping cart, etc.) prior to or after entering a state of ambulation. The crutch support 400 further enables the user to set the cuff 200 in an upright position such that the crutch can be easily accessed by a user, thereby allowing a user to transition into a state of ambulation with greater speed than traditional approaches. Further, the crutch support 400 further enables the user to transition from a state of ambulation to a state of rest with greater speed than traditional approaches. Such a feature may be advantageous as the user can set the crutch in an easily accessible state when it is not actively being used by the user. For example, prior to or after ambulation, the user can set the crutch on a tabletop via the crutch support 400 while the user is engaged or disengaged with the cuff 200. Further, the user can set the crutch in a state or position close to an ambulation state or position while maintaining the balance and the position of the crutch. Traditionally, the user may be required to set the crutch on the ground when not in a state of ambulation which may require a greater deal of effort by the user to transition into the state of ambulation. Therefore, the crutch support 400 can enable support of the cuff 200 and the crutch.

The crutch support 400 may be a portion of the crutch that can interact with a support. For example, the crutch support 400 may be a portion of the cuff 200 that protrudes outward (e.g., protrudes vertically outward, horizontally outward, etc.) relative to a rear surface of the cuff 200. In other examples, the crutch support 400 may be a hook and/or a series of hooks. Further, the crutch support 400 may be a stand and/or support that supports the crutch. It will be understood that the crutch support 400 may be any portion of the cuff 200 that can interact and/or engage with a support to provide support capabilities. In some embodiments, the cuff 200 may include multiple crutch supports 400. Further, the multiple crutch supports 400 can be located in series or in parallel (e.g., the crutch supports can be located at a same or a different position along the length of the cuff 200). The crutch support 400 may match a profile of a support. For example, where the crutch support 400 can interact with a rail, the profile of the crutch support 400 may generally be circular in nature. It will be understood that the crutch support may be any profile (e.g., circular, rectangular, linear, etc.). Further, the profile of the crutch support 400 may be adjustable by the user in order to adjust how the crutch support 400 interacts with a particular support.

In some embodiments, the crutch support 400 may be modular. One or more crutch supports 400 can be engaged or disengaged with the cuff 200 based on the requirements of the user. For example, in some instances, the user may not require a crutch support 400 and may remove the crutch support 400. In other examples, the user may require a crutch support 400 with a particular profile and may remove a first crutch support 400 with a first profile and attach a second crutch support 400 with a second profile. Therefore, the crutch support 400 may be modular such that the user can easily engage and disengage the crutch support 400.

Terminology

Although this disclosure has been described in the context of certain embodiments and examples, it will be understood by those skilled in the art that the disclosure extends beyond the specifically disclosed embodiments to other alternative embodiments and/or uses and obvious modifications and equivalents thereof. In addition, while several variations of the embodiments of the disclosure have been shown and described in detail, other modifications, which are within the scope of this disclosure, will be readily apparent to those of skill in the art. It is also contemplated that various combinations or sub-combinations of the specific features and aspects of the embodiments may be made and still fall within the scope of the disclosure. For example, features described above in connection with one embodiment can be used with a different embodiment described herein and the combination still fall within the scope of the disclosure. It should be understood that various features and aspects of the disclosed embodiments can be combined with, or substituted for, one another in order to form varying modes of the embodiments of the disclosure. Thus, it is intended that the scope of the disclosure herein should not be limited by the particular embodiments described above. Accordingly, unless otherwise stated, or unless clearly incompatible, each embodiment of this invention may include, additional to its essential features described herein, one or more features as described herein from each other embodiment of the invention disclosed herein.

Features, materials, characteristics, or groups described in conjunction with a particular aspect, embodiment, or example are to be understood to be applicable to any other aspect, embodiment or example described in this section or elsewhere in this specification unless incompatible therewith. All of the features disclosed in this specification (including any accompanying claims, abstract and drawings), and/or all of the steps of any method or process so disclosed, may be combined in any combination, except combinations where at least some of such features and/or steps are mutually exclusive. The protection is not restricted to the details of any foregoing embodiments. The protection extends to any novel one, or any novel combination, of the features disclosed in this specification (including any accompanying claims, abstract and drawings), or to any novel one, or any novel combination, of the steps of any method or process so disclosed.

Furthermore, certain features that are described in this disclosure in the context of separate implementations can also be implemented in combination in a single implementation. Conversely, various features that are described in the context of a single implementation can also be implemented in multiple implementations separately or in any suitable subcombination. Moreover, although features may be described above as acting in certain combinations, one or more features from a claimed combination can, in some cases, be excised from the combination, and the combination may be claimed as a subcombination or variation of a subcombination.

Moreover, while operations may be depicted in the drawings or described in the specification in a particular order, such operations need not be performed in the particular order shown or in sequential order, or that all operations be performed, to achieve desirable results. Other operations that are not depicted or described can be incorporated in the example methods and processes. For example, one or more additional operations can be performed before, after, simultaneously, or between any of the described operations. Further, the operations may be rearranged or reordered in other implementations. Those skilled in the art will appreciate that in some embodiments, the actual steps taken in the processes illustrated and/or disclosed may differ from those shown in the figures. Depending on the embodiment, certain of the steps described above may be removed, others may be added. Furthermore, the features and attributes of the specific embodiments disclosed above may be combined in different ways to form additional embodiments, all of which fall within the scope of the present disclosure. Also, the separation of various system components in the implementations described above should not be understood as requiring such separation in all implementations, and it should be understood that the described components and systems can generally be integrated together in a single product or packaged into multiple products.

For purposes of this disclosure, certain aspects, advantages, and novel features are described herein. Not necessarily all such advantages may be achieved in accordance with any particular embodiment. Thus, for example, those skilled in the art will recognize that the disclosure may be embodied or carried out in a manner that achieves one advantage or a group of advantages as taught herein without necessarily achieving other advantages as may be taught or suggested herein.

Conditional language, such as "can," "could," "might," or "may," unless specifically stated otherwise, or otherwise understood within the context as used, is generally intended to convey that certain embodiments include, while other embodiments do not include, certain features, elements, and/or steps. Thus, such conditional language is not generally intended to imply that features, elements, and/or steps are in any way required for one or more embodiments or that one or more embodiments necessarily include logic for deciding, with or without user input or prompting, whether these features, elements, and/or steps are included or are to be performed in any particular embodiment.

Conjunctive language such as the phrase "at least one of X, Y, and Z," unless specifically stated otherwise, is otherwise understood with the context as used in general to convey that an item, term, etc. may be either X, Y, or Z. Thus, such conjunctive language is not generally intended to imply that certain embodiments require the presence of at least one of X, at least one of Y, and at least one of Z.

Language of degree used herein, such as the terms "approximately," "about," "generally," and "substantially" as used herein represent a value, amount, or characteristic close to the stated value, amount, or characteristic that still performs a desired function or achieves a desired result. For example, the terms "approximately," "about," "generally," and "substantially" may refer to an amount that is within less than 10% of, within less than 5% of, within less than 1% of, within less than 0.1% of, and within less than 0.01% of the stated amount. As another example, in certain embodiments, the terms "generally parallel" and "substantially parallel" refer to a value, amount, or characteristic that departs from exactly parallel by less than or equal to 15 degrees, 10 degrees, 5 degrees, 3 degrees, 1 degree, 0.1 degree, or otherwise.

The scope of the present disclosure is not intended to be limited by the specific disclosures of preferred embodiments in this section or elsewhere in this specification, and may be defined by claims as presented in this section or elsewhere in this specification or as presented in the future. The language of the claims is to be interpreted broadly based on the language employed in the claims and not limited to the examples described in the present specification or during the prosecution of the application, which examples are to be construed as non-exclusive.

What is claimed is:

1. A crutch comprising:

a cuff;

a handle configured for gripping by a user; and a distal portion extending distally and configured to provide support to the user;

wherein the cuff comprises a wrist section and a forearm section, the wrist section configured to support a wrist portion of an arm of the user and the forearm section configured to support a forearm portion of the arm, a first side of the cuff configured to provide a first level of support to the arm, a second side of the forearm section configured to provide a second level of support to the arm, wherein the first level of support differs from the second level of support, wherein the first level of support decreases along a first portion of the cuff toward the handle, wherein the first level of support increases along a second portion of the cuff toward the handle, and wherein the second level of support decreases along the first portion of the cuff and the second portion of the cuff toward the handle.

2. The crutch of claim 1, wherein the cuff further comprises a rear wall, wherein the rear wall comprises a first material with first friction properties and the forearm section comprises a second material with second friction properties, wherein the first friction properties are greater than the second friction properties, wherein the first material comprises one or more of rubber or silicone.

3. The crutch of claim 1, wherein the cuff further comprises one or more slots, wherein the cuff is configured to engage with a portion of the crutch via the one or more slots, wherein a first slot of the one or more slots and a second slot of the one or more slots provide height adjustment of the crutch by adjusting a position of the cuff relative to the crutch.

4. The crutch of claim 1, wherein the cuff includes a crutch support, the crutch support configured to engage a support to provide stability to the crutch.

5. The crutch of claim 1, wherein the handle comprises a recess at one end of the handle that defines one or more hooks, the one or more hooks configured to engage with an adapter.

6. The crutch of claim 5, wherein the adapter supports one or more items therefrom while the user grabs the handle.

7. The crutch of claim 5, wherein the adapter connects to a second adapter of a second crutch to form a support.

8. The crutch of claim 5, wherein the handle further comprises a shaft, the shaft configured to receive a grip, wherein the shaft and the grip are configured to couple in a key-slot connection to fix an angular orientation of the grip on the shaft, the grip configured to be grabbed by the user to support the user's hand.

9. The crutch of claim 1, wherein the handle comprises a shaft, the shaft configured to receive a grip, wherein the shaft comprises a first cavity on a first end of the shaft, wherein the shaft comprises a second cavity on a second end of the shaft, wherein the shaft and the grip are configured to couple in a key-slot connection to fix an angular orientation of the grip on the shaft, the grip configured to be grabbed by the user to support the user's hand.

10. The crutch of claim 9, wherein the handle further comprises a contoured handle.

11. The crutch of claim 9, wherein the handle further comprises a recess at one end of the handle that defines one or more hooks, the one or more hooks configured to engage with an adapter.

12. The crutch of claim 9, wherein the handle further comprises a first portion and a second portion, the second portion of the handle configured to flex relative to the first portion of the handle.

13. The crutch of claim 1, wherein the handle comprises a first portion and a second portion, the second portion of the handle configured to flex relative to the first portion of the handle via an opening of the handle.

14. The crutch of claim 13, wherein the opening comprises a slot extending at least partially through the handle that facilitates flexion of the second portion relative to the first portion.

15. The crutch of claim 13, wherein the opening comprises a slot extending fully through the handle that facilitates flexion of the second portion relative to the first portion.

16. The crutch of claim 13, wherein the opening comprises a first slot and a second slot, the first slot extending partially through the handle in a first axis and the second slot extending partially through the handle in a second axis, wherein the first axis differs from the second axis, wherein the first and second slots facilitate flexion of the second portion relative to the first portion.

17. The crutch of claim 13, wherein the handle further comprises a hinge that facilitates flexion of the second portion relative to the first portion, wherein the hinge comprises a first portion of reduced thickness and a second portion of reduced thickness, the first portion of reduced thickness extending generally along a first axis and the second portion of reduced thickness extending generally along a second axis, wherein the first axis differs from the second axis, wherein the first and second portions of reduced thickness facilitate flexion of the second portion relative to the first portion.

18. The crutch of claim 13, wherein the handle further comprises a hinge that facilitates flexion of the second portion relative to the first portion, wherein the hinge comprises a portion of the handle of a first material with first flexion properties that differ from adjacent portions of the handle of a second material with second flexion properties, wherein the first flexion properties differ from the second flexion properties, wherein the difference between the first and second flexion properties facilitate flexion of the second portion relative to the first portion.

19. The crutch of claim 13, the crutch further comprising a crutch support, the crutch support configured to engage a support to provide stability to the crutch.

* * * * *